US011886864B1

(12) United States Patent
Govindarajan et al.

(10) Patent No.: US 11,886,864 B1
(45) Date of Patent: Jan. 30, 2024

(54) ENHANCED EDGE APPLICATION DEPLOYMENT AND PROCESSING IN A NETWORK

(71) Applicant: INTERNATIONAL BUSINESS MACHINES CORPORATION, Armonk, NY (US)

(72) Inventors: Chander Govindarajan, Chennai (IN); Kavya Govindarajan, Chennai (IN); Mudit Verma, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 17/813,048

(22) Filed: Jul. 18, 2022

(51) Int. Cl.
*G06F 8/65* (2018.01)

(52) U.S. Cl.
CPC .................... *G06F 8/65* (2013.01)

(58) Field of Classification Search
None
See application file for complete search history.

(56) References Cited

U.S. PATENT DOCUMENTS

| 10,172,064 B2 | 1/2019 | Agrawal et al. |
| 2020/0296155 A1 | 9/2020 | McGrath et al. |
| 2021/0014133 A1 | 1/2021 | Maciocco et al. |
| 2021/0059011 A1 | 2/2021 | Fang et al. |
| 2021/0129019 A1 | 5/2021 | Colenbrander |
| 2022/0124009 A1* | 4/2022 | Metsch ............... G06Q 10/087 |
| 2023/0139509 A1* | 5/2023 | Landman ................. G06F 8/65 |
| | | 717/168 |

OTHER PUBLICATIONS

Farris et al., "Providing Ultra-Short Latency to User-Centric 5G Applications at the Mobile Edge Network", Transactions on Emerging Telecommunications Technologies, vol. 29, Issue 4, first published Mar. 20, 2017, https://doi.org/10.1002/ett.3169 (Year: 2017).
Xu et al., "Collaborate or Separate? Distributed Service Caching in Mobile Edge Clouds", IEEE INFOCOM 2020—IEEE Conference on Computer Communications, doi: 10.1109/INFOCOM41043.2020. 9155365, pp. 2066-2075 (Year: 2020).

(Continued)

*Primary Examiner* — Qing Chen
(74) *Attorney, Agent, or Firm* — Tihon Poltavets, Esq.; Kevin P. Radigan, Esq.; HESLIN ROTHENBERG FARLEY & MESITI P.C.

(57) ABSTRACT

Edge application deployment in a network is provided. The network includes a plurality of edge sites with edge computing infrastructure. Edge application deployment is performed, including deploying a pseudo application instance (pApp) of the edge application at each edge site of a first group of edge sites of the plurality of edge sites, and deploying a real application instance (rApp) of the edge application at each edge site of a second group of one or more edge sites of the plurality of edge sites. The pApp is a lightweight, application-specific instance of the rApp with less application functionality than the rApp. Further, the first group of edge sites is larger than the second group, and a user device interaction with the edge application is through a selected pApp of the first group of edge sites to an rApp of the second group.

20 Claims, 15 Drawing Sheets

(56) References Cited

OTHER PUBLICATIONS

Chen et al., "Optimal Application Deployment in Mobile Edge Computing Environment", 2020 IEEE 13th International Conference on Cloud Computing (CLOUD), published Dec. 2020, 8 pages (Year: 2020).

Duo et al., "SDN-Based Handover Scheme in Cellular/IEEE 802.11p Hybrid Vehicular Networks", Sensors 2020, 20, 1082; doi: 10.3390/s20041082; https://www.mdpi.com/journal/sensors, 17 pages (Year: 2020).

Farris et al., "Optimizing Service Replication for Mobile Delay-Sensitive Applications in 5G Edge Network", 2017 IEEE International Conference on Communications (ICC), pp. 1-6, doi: 10.1109/ICC.2017.7997282 (Year: 2017).

Mel et al., "The NIST Definition of Cloud Computing," National Institute of Standards and Technology, Information Technology Laboratory, Special Publication 800-145, Sep. 2011 (pp. 1-7).

Mfula et al., "Seamless Kubernetes Cluster Management in Multi-Cloud and Edge 5G Applications", International Conference on High Performance Computing and Simulation (HPCS 2020), Conference No. 18, Mar. 22-27, 2021, http://hpcs2020.cisedu.info/ (12 pages) (Year: 2021).

Ogbuachi et al., "Context-Aware Kubernetes Scheduler for Edge-Native Applications on 5G", Journal of Communications Software and Systems, vol. 16, No. 1, Mar. 2020, pp. 85-94 (Year: 2020).

Okwuibe et al., "Orchestrating Service Migration for Low Power MEC-Enabled IoT Devices", https://www.researchgate.net/publication/333505572, published in ResearchGate, May 2019, 7 pages (Year: 2019).

Safavat et al., "Recent Advances in Mobile Edge Computing and Content Caching", Digital Communications and Netowrks, vol. 6, Issue 2, May 2020, pp. 189-194 (Year: 2020).

Scotece et al., "MEFS: Mobile Edge File System for Edge-Assisted Mobile Apps", 2019 IEEE 20th International Symposium on 'A World of Wirless, Mobile and Multimedia Networks' (WoWMoM), published Jun. 2019, 9 pages (Year: 2019).

Int'l. Search Report (ISR) & Written Opinion (WO) for International Application No. PCT/EP2023/068446, dated Sep. 25, 2023 (12 pages) (Year: 2023).

Hong et al., "qCon: QoS-Aware Network Resource Management for Fog Computing", Sensors, vol. 18, No. 10, Oct. 13, 2018 (21 pages) (Year: 2018).

Ungreanu et al., "Collaborative Cloud-Edge: A Declarative API Orchestration Model for the NextGen 5G Core", 2021 IEEE Int'l. Conference on Service-Oriented System Engineering (SOSE), Aug. 23, 2021 (10 pgs.) (Year: 2021).

\* cited by examiner

US 11,886,864 B1

ENHANCED EDGE APPLICATION DEPLOYMENT AND PROCESSING IN A NETWORK

BACKGROUND

One or more aspects relate, in general, to edge computing, and more particularly, to improving edge computing in a network, such as a cellular network, by enhanced edge application deployment and processing.

In a cloud environment, edge computing (i.e., computing at or near a boundary) enables processing and/or storage of data to be provided closer to the device(s) where operations are being performed. Accordingly, edge computing can eliminate the need for data to be processed or stored being transmitted to a central location (e.g., a central cloud server), which may be physically located a significant distance from the device(s). Although this configuration may not provide a substantial change to the services being provided from an individual device perspective, the large increase of Internet of Things (IoT), and other electronic devices, including mobile devices, exponentially increases network requirements when utilizing cloud services, which can cause an increase in latency, potentially resulting in lower quality of service, higher bandwidth costs, etc. Advantageously, edge computing can assist in alleviating these issues.

Multi-access edge computing (MEC) provides a computing approach where cloud-computing capabilities in an information technology (IT) service environment are provided at the edge of a network. MEC provides an ecosystem in which applications and services can be flexibly and rapidly deployed.

In cellular communication, 5G is the next generation of broadband cellular networks, which allow for significantly increased communication rates. MEC has implementations for various networks, and 5G implementations have been expanding as service providers adopt this most current and technology-advanced system for customers. When combined, MEC and 5G can be a powerful force in the world of computing. The emergence of 5G network capabilities continues to increase with the number of connected devices on a network, which spurs the need for edge computing to help distribute networking demands. Applications that rely heavily on a consistent network connection, rapid deployment, and low latency include burgeoning technologies such as artificial intelligence (AI), IoT, virtual reality (VR), augmented reality (AR), etc. MEC and 5G networking together allow for simultaneous usage of a massive number of connected technologies without incurring network outages due to traffic bottlenecks. Current edge application deployment and processing approaches can be further improved, however, including for cellular networks.

SUMMARY

Shortcomings of the prior art are overcome, and additional advantages are provided through the provision of a computer program product for facilitating processing within a computing environment. The computer program product includes one or more computer-readable storage media and program instructions embodied therewith. The program instructions are readable by a processing circuit to cause the processing circuit to perform a method which includes performing edge application deployment in a network. The network includes a plurality of edge sites with edge computing infrastructure. The performing includes deploying a pseudo application instance (pApp) of the edge application at each edge site of a first group of edge sites of the plurality of edge sites, and deploying a real application instance (rApp) of the edge application at each edge site of a second group of one or more edge sites of the plurality of edge sites. The pApp is a lightweight, application-specific instance of the rApp with less application functionality than the rApp, and the first group of edge sites is larger than the second group. Further, a user device interaction with the edge application is through a selected pApp of the first group of edge sites to an rApp of the second group.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 8:
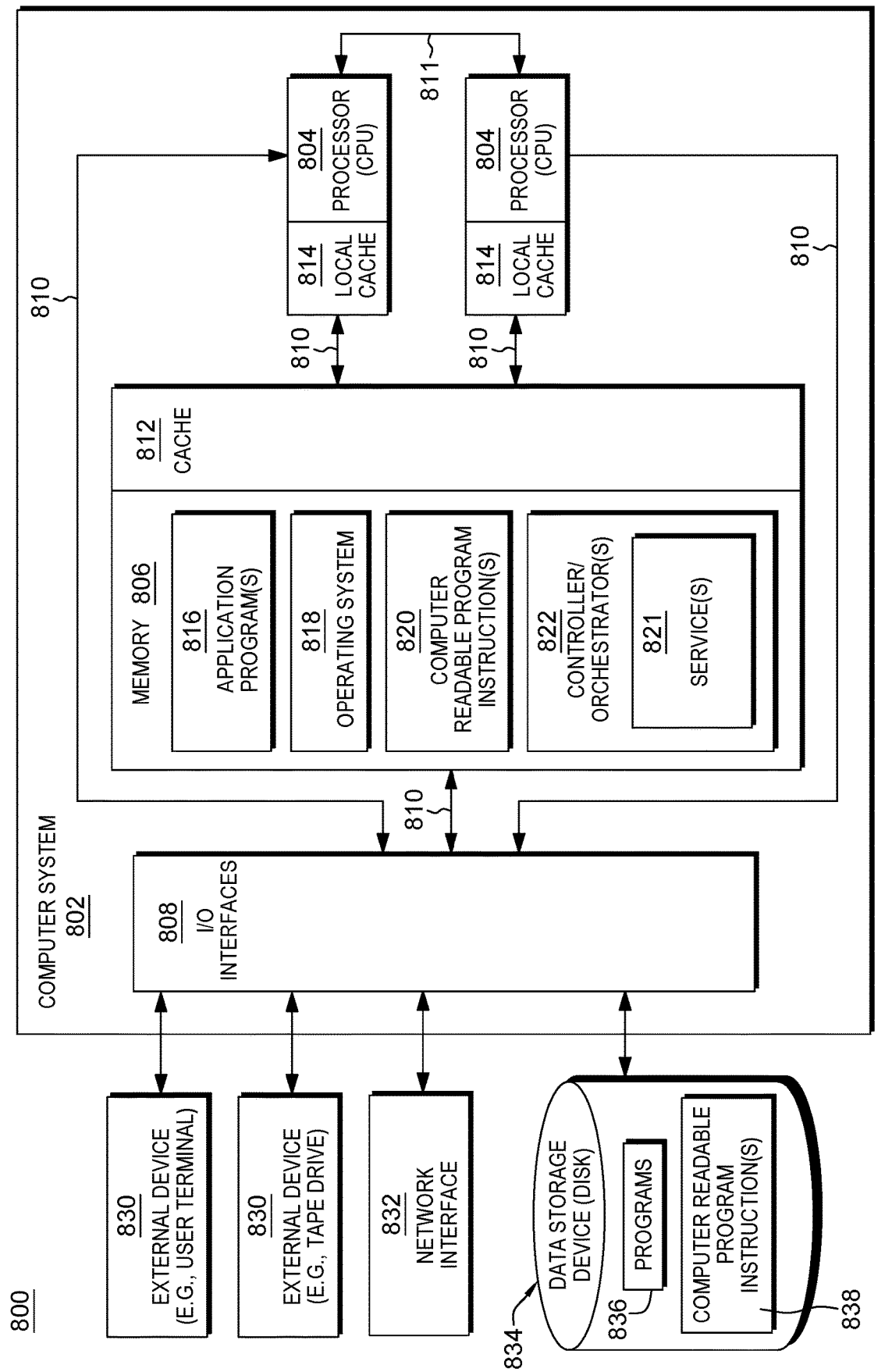
FIG. 8 depicts one example of a computing environment to incorporate and use one or more aspects of the present invention.

As understood by one skilled in the art, program code, as referred to in this application, can include both software and hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 8 as application program(s) 816, computer-readable program instruction(s) 820, controller/orchestrator(s) 822, and service(s) 821, which are stored in memory 806, by way of example only.

By way of example, containerization is the packaging of software code (for instance, to implement a service or microservice) with its dependencies, such as operating system libraries and/or other dependencies, used to run the software code to create a single, lightweight executable, referred to as a container. The container is portable in that it runs consistently and reliably on any information technology infrastructure. In one or more embodiments, the software code can be an application, such as an edge application in the case of edge-based computing. A container is created from a container image, which is a static file that includes executable program code that can be run as an isolated process on a computing or information technology (IT) infrastructure. One image can be used to run one or more containers, which are runtime instances of the container image. Containers are lightweight (e.g., they share the machine's operating system), efficient, easy to manage, secure, and portable.

One example of a product used to provide and manage containers is Kubernetes©, which is an open-source system for automating deployment, scaling and management of containerized applications. (Note in this regard that Kubernetes® is a Registered Trademark of the Linux Foundation in at least one jurisdiction.) Kubernetes groups containers that make up an application into logical units for easy management and discovery. In operation, Kubernetes orchestrates a containerized application to run on a cluster of hosts (or nodes), and automates deployment and management of cloud-native applications using on-premise infrastructure or public cloud platforms. The Kubernetes system is designed to run containerized applications across a cluster of nodes (or servers), which can be at a single geographic location or distributed across multiple geographic locations. In one or more implementations, a cluster is a set of nodes (whether physical computing resources or virtual computing resources) running Kubernetes agents, managed by the Kubernetes control plane.

Container orchestration is the automation of much of the operational effort required to run containerized workloads and services. Orchestration includes a wide range of processes required to maintain a container's lifecycle, including provisioning, deployment, scaling (up and down), networking, load-balancing, and more. Note that Kubernetes is one example only of a orchestration platform that can be used to manage, for instance, application deployment, such as disclosed herein. In one or more embodiments, other platforms, such as Function as a Service (FaaS), etc., can be used to manage application deployment, in accordance with one or more aspects disclosed herein.

Use of edge-based computing, including edge application services, advantageously reduces the volume of data to be transferred, as well as the subsequent traffic, and distance the data must travel. This results in a lower latency and reduces transmission costs. Computational offloading to the edge (for example, to one or more edge sites of a network, such as of a cellular network), can advantageously benefit response times for real-time applications. In one or more implementations, edge-based containers are decentralized computing resources located close to the end-user equipment (e.g., device or system) in order to reduce latency, save bandwidth, and enhance the overall digital experience.

Figure 1A:
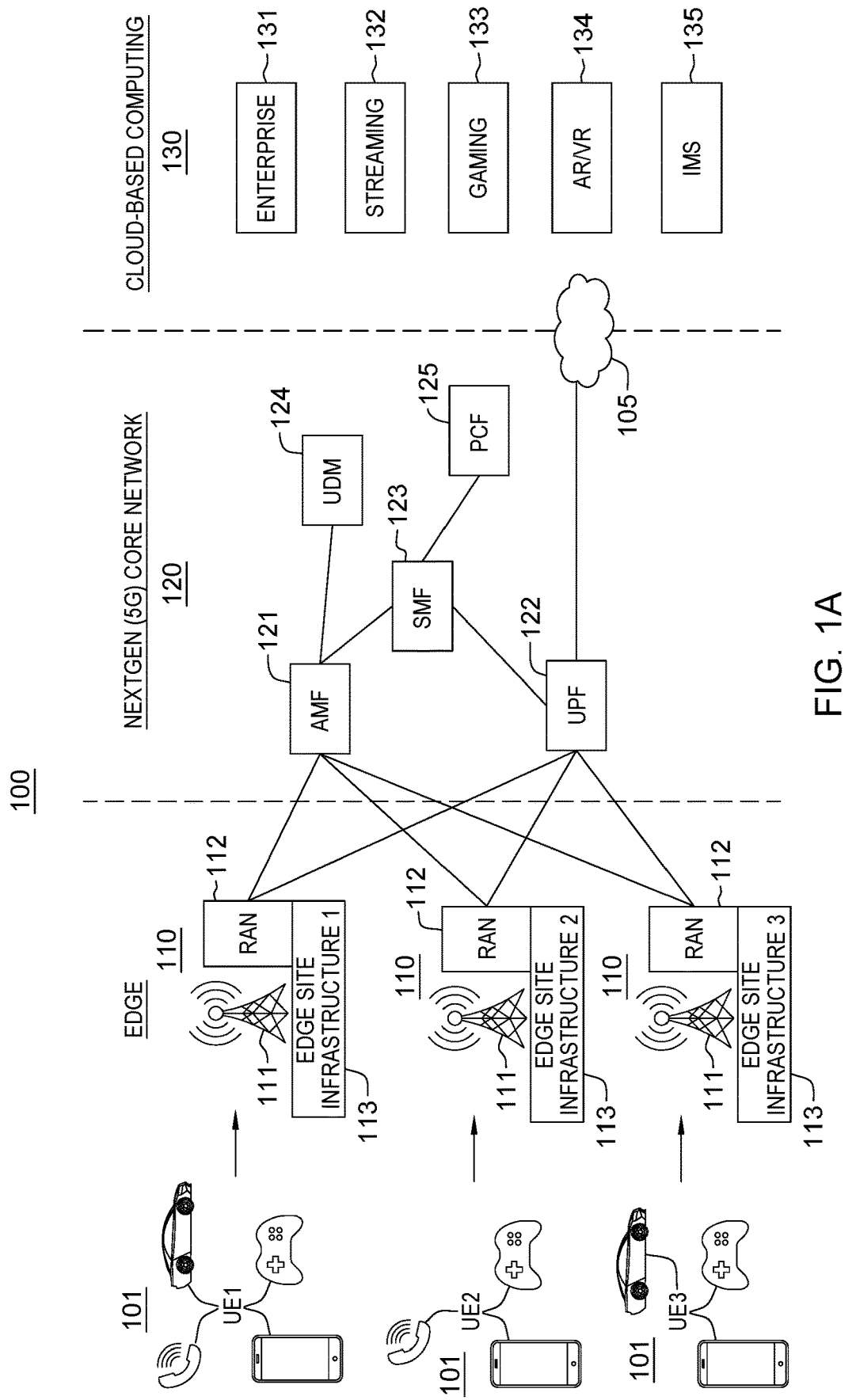
FIG. 1A depicts one example of a cellular network with edge-based computing, which is to implement edge application deployment and processing, in accordance with one or more aspects of the present invention.

By way of example only, FIG. 1A depicts one embodiment of a next generation cellular network, generally denoted 100. Cellular network 100 includes multiple edge sites 110, each with a respective cell tower 111 for wirelessly interfacing with various types of user equipment 101, UE1, UE2, UE3, within range of the cell tower. In the depicted embodiment, each edge site 110 includes a radio access network 112 interfacing edge site computing infrastructure 113 and (for instance) a next generation (5G) core network 120. As illustrated, core network 120 can (in one embodiment) facilitate communication with one or more cloud-based computing resources 130, such as one or more cloud-based computing enterprise applications 131, audio-visual streaming applications 132, gaming applications 133, augmented reality (AR) and/or virtual reality (VR) applications 134, and/or database applications 135, such as an information management system (IMS), etc. In one embodiment, next gen core network 120 can include, for instance, a user plane function (UPF) 122, which interfaces the radio access network(s) 112 and a data network 105, such as a local-area network (LAN), a wide-area network (WAN), such as the Internet, or a combination thereof, which can include wired, wireless, fiber-optic connections, etc. The network(s) 105 can include one or more wired and/or wireless networks that are capable of receiving and transmitting data, such as data related to one or more of the applications referenced herein. As further illustrated, an access mobility function (AMF) 121 interfaces, in one embodiment, radio access networks (RANs) 112 of edge sites 110 and a session management function (SMF) 123 facility and a unified data management (UDM) 124 facility. Session management function (SMF) 123 further interfaces with a policy control function (PCF) 125, in one embodiment.

In operation, user equipment 101, UE1, UE2 & UE3, represent, in one or more embodiments, one or more wireless user devices, such as smartphones, mobile phones, gaming devices, wireless vehicle devices/systems, wireless computers, etc., which can change their point of attachment in the cellular network 100 by movement or migration away from a cell tower in one cell region to a cell tower in another cell region of the network. In such a case, a wireless session can start to be served by a new network application-aware server, or "edge app" server, with the state of the edge app server associated with the user device being migrated from a prior edge server at a source node to a new edge server at a destination node or site. As noted, the cellular network includes respective cell towers 111 and associated edge-of-network components and infrastructure 113, such as one or more computing resources (such as, one or more servers) that are functioning as, or part of, the cell that the mobile user equipment is in communication with.

As a mobile device moves out of communication range with a first edge site, the cellular network automatically enables an edge site in another geographical area to maintain the communication session with the user device over a new communication path. This functionality is inherent in cellular network 100 to maintain a current communication session between the user device and one or more cell towers as the user device moves from one area to another.

To effect the seamless transition, the cellular network infrastructure includes radio access networks (RANs) 112, such as the 5G new radio (NR) wireless air interface with a logical 5G radio node (gNB). Radio access networks 112 provide control and management of the radio transceivers of the cell node (base transceiver station) equipment, as well as perform management tasks, such as hand-off of a cell communication session. Typically, the cellular network interfaces via, for instance, the Internet, and facilitates control of elements necessary to provide application services to an end-user including, for instance, radio spectrum allocation, wireless network infrastructure, back-haul infrastructure, provisioning computer systems, etc.

Figure 1B:
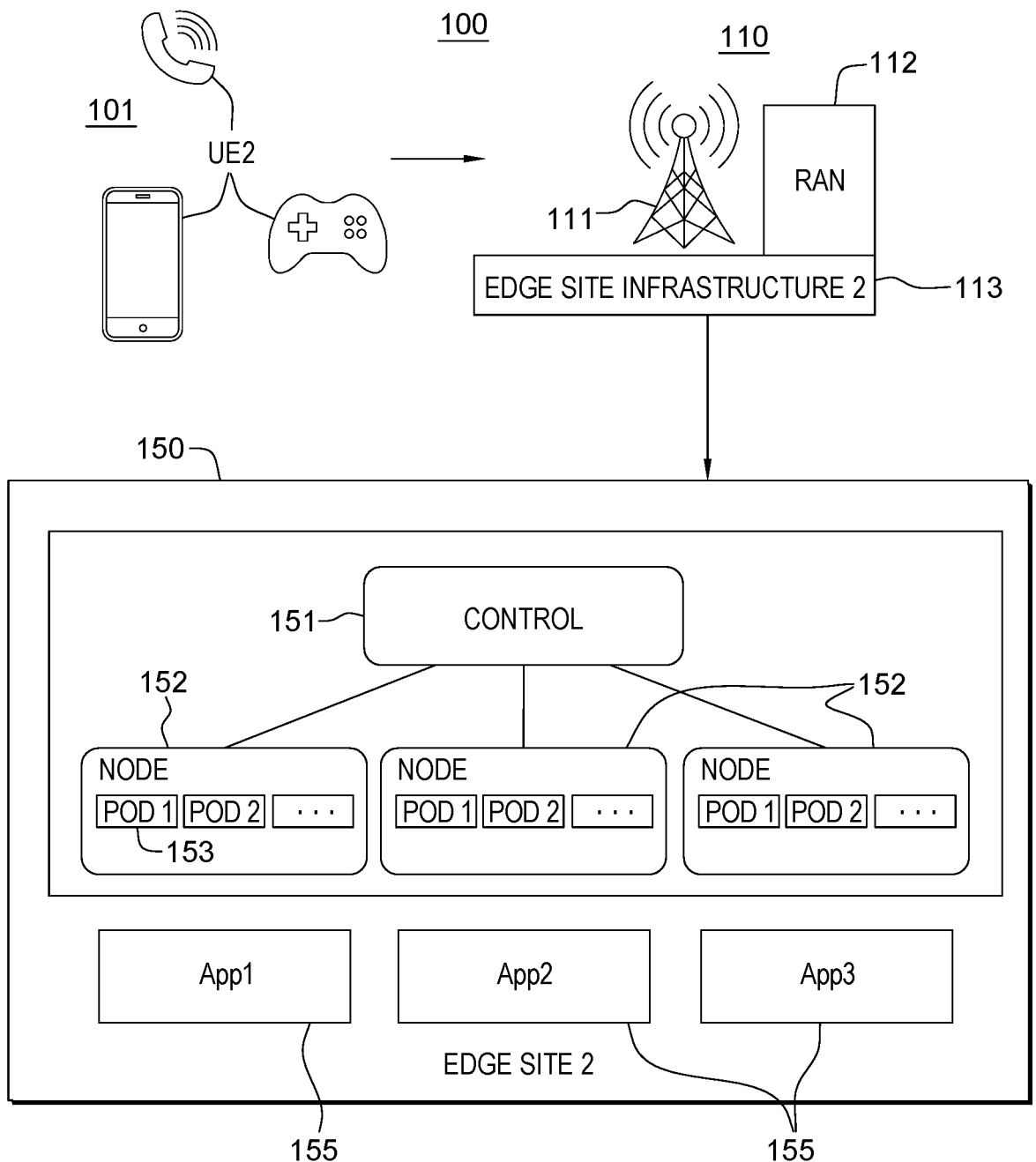
FIG. 1B depicts one embodiment of edge computing at an edge site of a cellular network such as depicted in FIG. 1A, which is to implement edge application deployment and processing, in accordance with one or more aspects of the present invention.

As noted, with the advent of 5G networks, latency-sensitive applications, such as enterprise applications, manufacturing applications, health care applications, IoT applications, etc., are moving closer to the edge of the cellular network, and being run increasingly as services, or microservices. FIG. 1B depicts an example of this, where edge site 2 (in the example of FIG. 1A) includes, for instance, a container orchestrator 150, with a cluster control 151, such as a Kubernetes control, interfacing with multiple nodes 152 (e.g., servers), each supporting one or more higher level software constructs, or pods 153, Pod1, Pod2, etc., each including one or more service applications 155 (or edge applications, such as App1, App2, App3). In one or more implementations, edge site computing infrastructure 113, along with tower 111 and radio access network 112, perform edge-site processing; with one or more of the edge sites running (in one embodiment) a container orchestrator 150, such as Kubernetes, which orchestrates containerized applications to run on a cluster of host nodes. In operation, user equipment UE2 (e.g., a user mobile device) automatically selects the tower with the strongest signal, and the audio, video and/or Internet is processed from there. With movement of user equipment UE2, the appropriate tower is automatically reselected. With edge app deployment onto clusters such as depicted in FIG. 1B, load-balancing is typically unaware of the client location or client replica latency and/or network conditions, and conventionally would not handle client movement. Disclosed herein is an enhanced system and method for edge application (edge app) deployment and related edge application processing which is as seamless as cell tower selection and handover is within the cellular network.

Edge site-deployed application orchestration such as disclosed herein balances two often conflicting requirements. The first requirement is to maximize the quality of service (QoS) by, for instance, minimizing response time for every end-user. This implies, for instance, that by moving an application close to the edge, more replications of the application are required. The second requirement is to minimize required cluster resources due to resource constraints at the edge by, for instance, optimizing application placement to, for instance, have less replicas of applications, and thereby reduce overhead. Balancing the two requirements is challenging in the context of certain networks, such as cellular networks. For instance, mobility of the user equipment (e.g., devices) makes maximizing quality of service (QoS) difficult, and overall network traffic patterns at the cellular network edge keep changing, meaning that minimizing cluster resources can be difficult.

Embodiments of the present invention include computer program products, computer-implemented methods, and computer systems, where program code executing on one or more processors performs a method, which includes (in one aspect) performing edge application deployment in a network. The network includes a plurality of edge sites with edge computing infrastructure. The performing includes deploying a pseudo application instance (pApp) of the edge application at each site of a first group of edge sites of the plurality of edge sites. Further, the method includes deploying a real application instance (rApp) of the edge application at each edge site of a second group of one or more edge sites of the plurality of edge sites. The pApp is a lightweight, application-specific instance of the rApp, with less application functionality than the rApp. Further, the first group of edge sites is larger than the second group, and a user device interaction with the edge application is through a selected pApp of the first group of edge sites to an rApp of the second group.

In accordance with one or more aspects disclosed herein, an edge application is split into two layers, that is, into pseudo application instances (pApps), which are lightweight instances of the edge application that are amendable to migration, and real application instances (rApps), which are full instances of the edge application. The pseudo application instances (pApps) are low-cost and act as point of contact to end users for the edge application, and provide routing to the actual, real application instance (rApp), while also allowing for transparent mobility. In one or more implementations, computer program products, computer-implemented methods, and computer systems are provided, where program code executing on one or more processors runs pseudo application instances (pApps) such as disclosed herein for cluster orchestration at the edge of the network. The pseudo application instance (pApp) is a new abstraction for managing applications on edge cluster orchestrators. By splitting an application into layers, the edge application can be deployed with a higher Quality of Service (QoS), while also saving computing resources for, for instance, container orchestrators.

Numerous inventive aspects are disclosed herein in association with the concepts presented. For instance, program products, systems and methods are presented for deploying a service as a collection of pseudo application instances (pApps) or replicas running on any desired number of multiple edge sites of a network, such as all edge sites of the network. The pApps have an ability to route connections to real application instances (rApps) and handover user connections to other pseudo application instances (pApps) to facilitate managing cluster orchestrator tradeoffs, while supporting seamless cell tower-like mobility of end users of edge applications. In one or more implementations, an edge application or service can be deployed as a collection of pseudo application instances (pApps) running on a first group of edge sites (such as a majority, or all, edge sites of a network), and real application instances (rApps) running on selected edge sites of the network. Further, in one or more embodiments, methods to handover one or more edge user interactions (traffic) from one pseudo application instance (pApp) to another pseudo application instance (pApp) upon user device mobility is provided, as are methods to route end user interconnection (i.e., traffic) from one pseudo application instance (pApp) to a selected real application instance (rApp), where the real application instance (rApp) can be selected based on telecommunications network derived link performance measurements. Further, in one or more implementations, methods to upgrade a pseudo application instance (pApp) at an edge site to a real application instance (rApp) are provided to, for instance, meet end user Quality of Service (QoS) requirements, as are methods to select a particular pseudo application instance (pApp) upgrade to optimize overall network flows. Theses, as well as other aspects and features of the present invention are disclosed herein to facilitate edge application deployment and processing within a network, such as a cellular network.

Figure 2A:
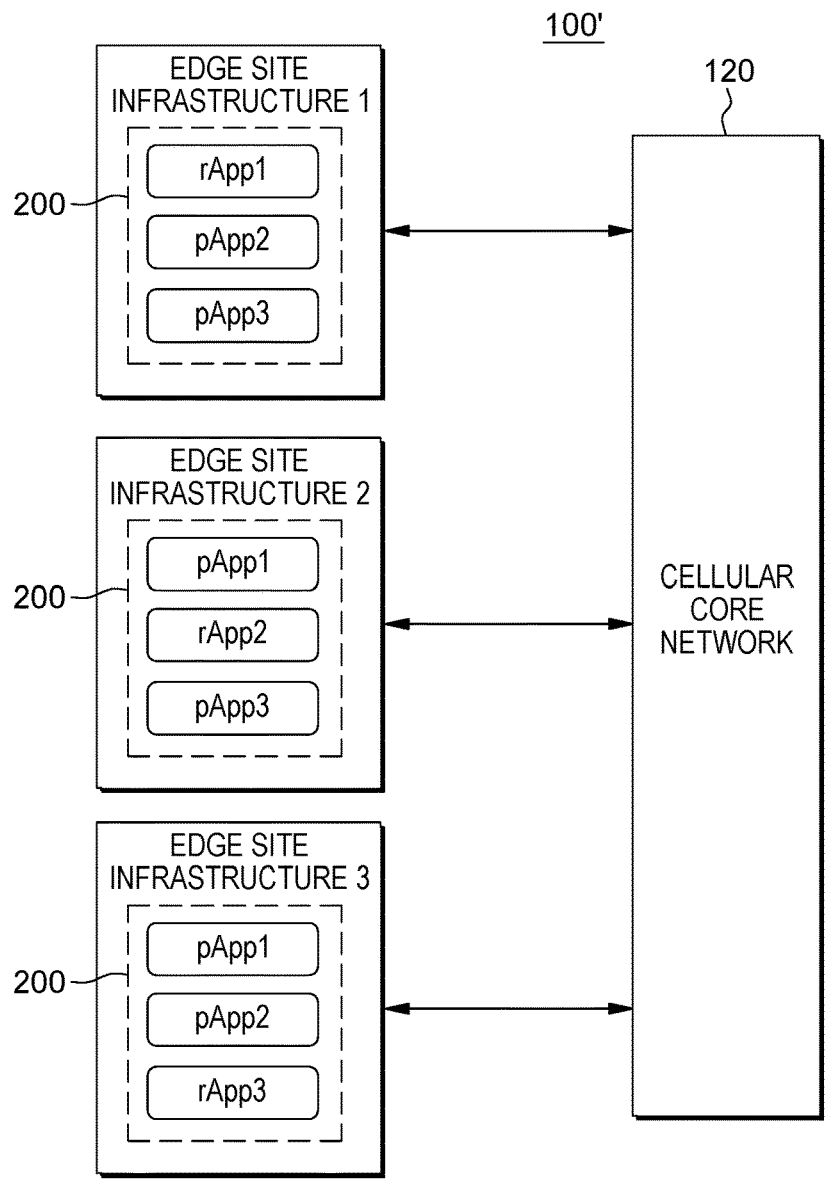
FIG. 2A depicts one embodiment of a cellular network with edge application deployment, in accordance with one or more aspects of the present invention.

FIG. 2A depicts one embodiment of an edge application deployed, in accordance with one or more aspects of the present invention. By way of example, network 100', which is similar to network 100 described above in connection with FIGS. 1A & 1B, includes multiple edge sites, each with respective edge computing infrastructure. In the embodiment depicted, the edge computing infrastructures 200 support multiple edge applications, with real application instances (rApp1, rApp2, rApp3) each being shown on one of the edge sites only in this example, and pseudo application instances (pApp1, pApp2, pApp3) residing at the other edge sites, such that each edge site either has a pseudo application instance (pApp) of an application (App1, App2, App3), or a real application instance (rApp) of that edge application. Note that this is one embodiment only, and that in other embodiments, each edge site of the network can include a pseudo application instance (pApp) of the edge application, even at an edge site where a real application instance (rApp) of the edge application resides. For instance, in one or more embodiments, for a particular edge application, there is a corresponding pseudo application instance (pApp) of that application running at every edge site of the network. In implementation, there can be one or more real application instances (rApp) of the application deployed. In one or more further implementations, only certain edge sites of the plurality of edge sites in a network need contain either a pseudo application instance (pApp) or a real application instance (rApp) of the edge application. Generally, however, the pApp is included in a first group of edge sites of the network that is larger than the second group of one or more edge sites running the real application instance (rApp).

Figure 2B:
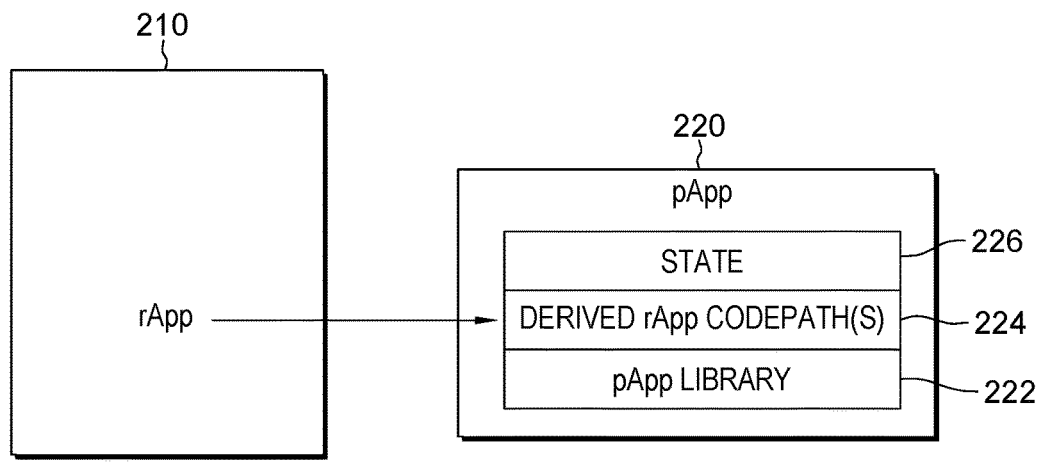
FIG. 2B depicts one embodiment of a pseudo application instance (pApp) of an edge application derived (in one embodiment) from a real application instance (rApp) of the edge application, in accordance with one or more aspects of the present invention.

As illustrated in FIG. 2B, in one or more embodiments, a pseudo application instance (pApp) of an application can be derived from a real application instance (rApp). In one or more implementations, the pseudo application instance (pApp) has less application functionality than the real application instance (rApp), and can include, for instance, a pseudo application framework/library (pApp Lib) 222, which (in one embodiment) facilitates providing functionalities such as routing, load-balancing, proxy, caching and control management. Further, the pApp instance can include one or more rApp code paths 224 (i.e., one or more application-specific code paths), as well as operational state information 226 for one or more user device interactions or sessions with the edge application handled via the pApp. In one or more deployment processes, k real application instances (rApps) of an edge application are provided in the network, and n pseudo application instances (pApps) of the edge application, with k«n, and in one or more embodiments, with n approaching or equaling the number of edge sites. The pseudo application instances (pApps) derived from the real application are by definition lightweight, with less application functionality and less processing overhead required in comparison to the real application instance. Further, in one or more implementations, all pseudo application instances (irrespective of the real application instance) can have some common functionality implemented as a library, such as, caching, routing, control logic, etc. Further, each pseudo application instance is derived or built for a particular real application instance (rApp), and can have some real application-specific code paths. In one embodiment, code annotations can be used to capture real application code paths which are to be implemented in the pseudo application instance (pApp). Further, the pseudo application instance can be a parallel implementation, in one or more embodiments. For instance, in one or more embodiments, the development operator can submit code to run on the pseudo application instance (pApp). For a particular function in the real application instance (rApp) a function can be implemented in the pseudo application instance (pApp). In one or more embodiments, the function might, for instance, perform checks, and depending on the result, return results based on the check, for instance, from the cache, or route the results to the real application instance (rApp).

Figure 3A:
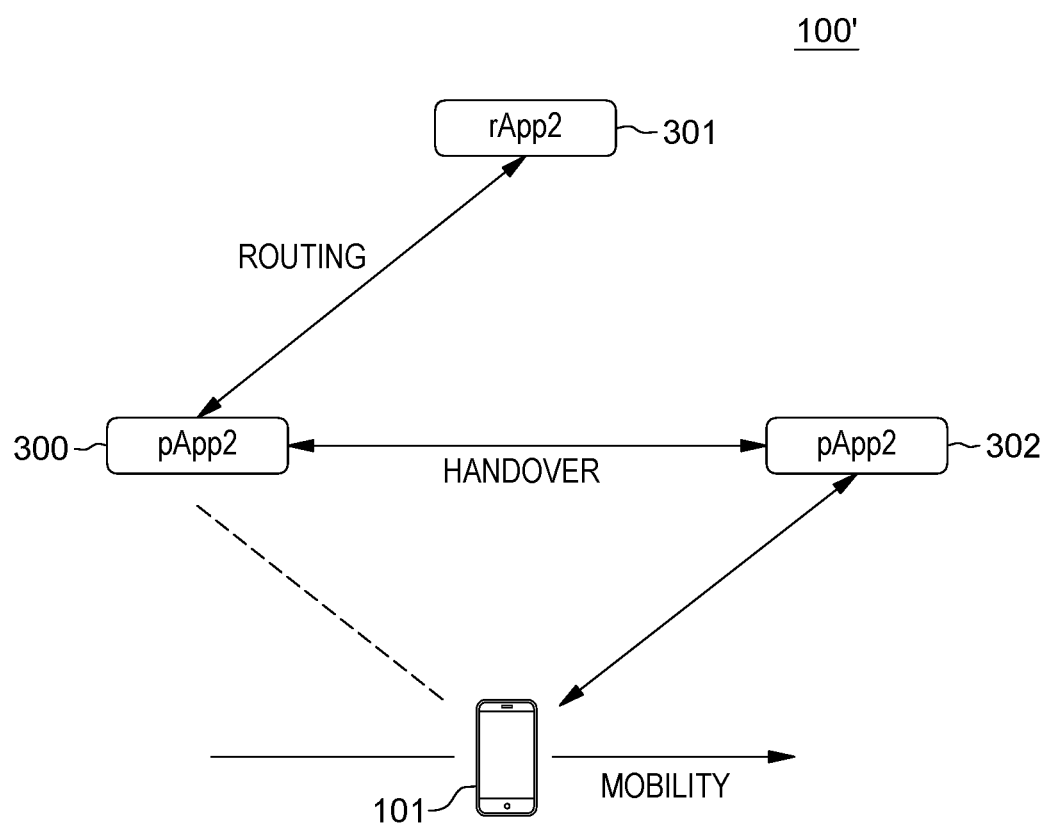
FIG. 3A depicts one embodiment of pseudo application instance (pApp) handover within a network with mobility of a user device interaction with the application, in accordance with one or more aspects of the present invention.

Advantageously, in one or more embodiments, deploying pseudo application instances (pApps) of an edge application to multiple edge sites of a network facilitates balancing the conflicting requirements of maximizing Quality of Service (QoS) while minimizing, for instance, cluster resources required to implement the edge application within the network where load is dynamically changing. Computer program products, computer-implemented methods and computer systems are provided herein, with program code for deploying a service (or microservice) as a collection of pseudo application instances (pApps) running on, for instance, many, or all, edge sites, with an ability to route connections to real application instances (rApps), and handover to other pApps when appropriate, to assist with cluster orchestration tradeoffs, while supporting seamless cell tower like mobility of users of the edge application. FIG. 3A depicts one embodiment of the ability to handover a user device interface (e.g., user session) from one pApp to another pApp with user mobility.

In FIG. 3A, network 100' described above in connection with FIGS. 2A & 2B is shown, including a pseudo application instance (pApp) 300 of an edge application with a prior connection to user equipment 101, such as a mobile user device. As illustrated, pApp 300 has a routing connection to a real application instance (rApp) 301 of the edge application to facilitate user-request processing in connection with the user device interaction. With mobility of user equipment 101, pApp 300 automatically hands over the user device interaction or session to another, closer pseudo application instance (pApp) 302 in the network to allow uninterrupted access to the edge application by user equipment 101, notwithstanding movement of the user equipment.

In one or more implementations, edge application deployment processing such as described herein includes routing traffic from one pApp to an rApp, where the rApp is selected based on, for instance, network-derived, link performance measurements. In one or more embodiments, pApp 302 can continue to route the user device interaction with the edge application to real application instance (rApp) 301, or to another, for instance, closer real application instance (rApp) to pApp 302.

Further, provision of pseudo application instances (pApps) such as disclosed herein allows for the upgrading of a pseudo application instance to a real application instance when necessary to, for instance, meet client Quality of Service (QoS) requirements, and allows for the selection of one or more pseudo application instances to be upgraded to real application instances to optimize overall network flows. Further, in one or more embodiments, real application instances (rApps) can be downgraded to pseudo application instances (pApps) when desirable to, for instance, optimize resource usage within the network. Upgrading of a pseudo application instance (pApp) and/or downgrading of real application instance (rApp) can occur via a variety of approaches. In one embodiment, the running instance can be stopped, and the other, desired instance can be started in place of the stopped instance. In other embodiments, where the pApp specification includes, for instance, a virtual machine (VM)/container image required to run the rApp, the upgrade process can be faster than a normal rApp deployment, since the rApp specification does not need to be downloaded. In another embodiment, at every pApp, an rApp instance can be prepared and stored in a suspended state. In this approach, some memory may be consumed at the edge site, but not as much as an rApp normally requires, and no compute/network bandwidth is required with the rApp stored in suspended state. In such an approach, the upgrade process is simply to activate the prepared rApp instance, which can quickly occur. Downgrading a real application instance (rApp) to a pseudo application instance (pApp) can occur via a variety of similar approaches.

As noted, in one or more embodiments, enhanced edge application deployment and processing within a network are provided. In one or more implementations, program code is provided for deploying an edge application as a collection of pseudo application instances (pApps) and one or more real application instances (rApps). For instance, in one embodiment, a pseudo application instance of the edge application is deployed at each edge site of a first group of edge sites of a plurality of edge sites in a network, and a real application instance (rApp) of the application is deployed at each edge site of a second group of one or more edge sites of the plurality of edge sites, where the first group of edge sites is larger than the second group. In one example, pseudo application instances can be deployed at each edge site in the network, with real application instances being deployed at only selected edge sites.

Figure 3B:
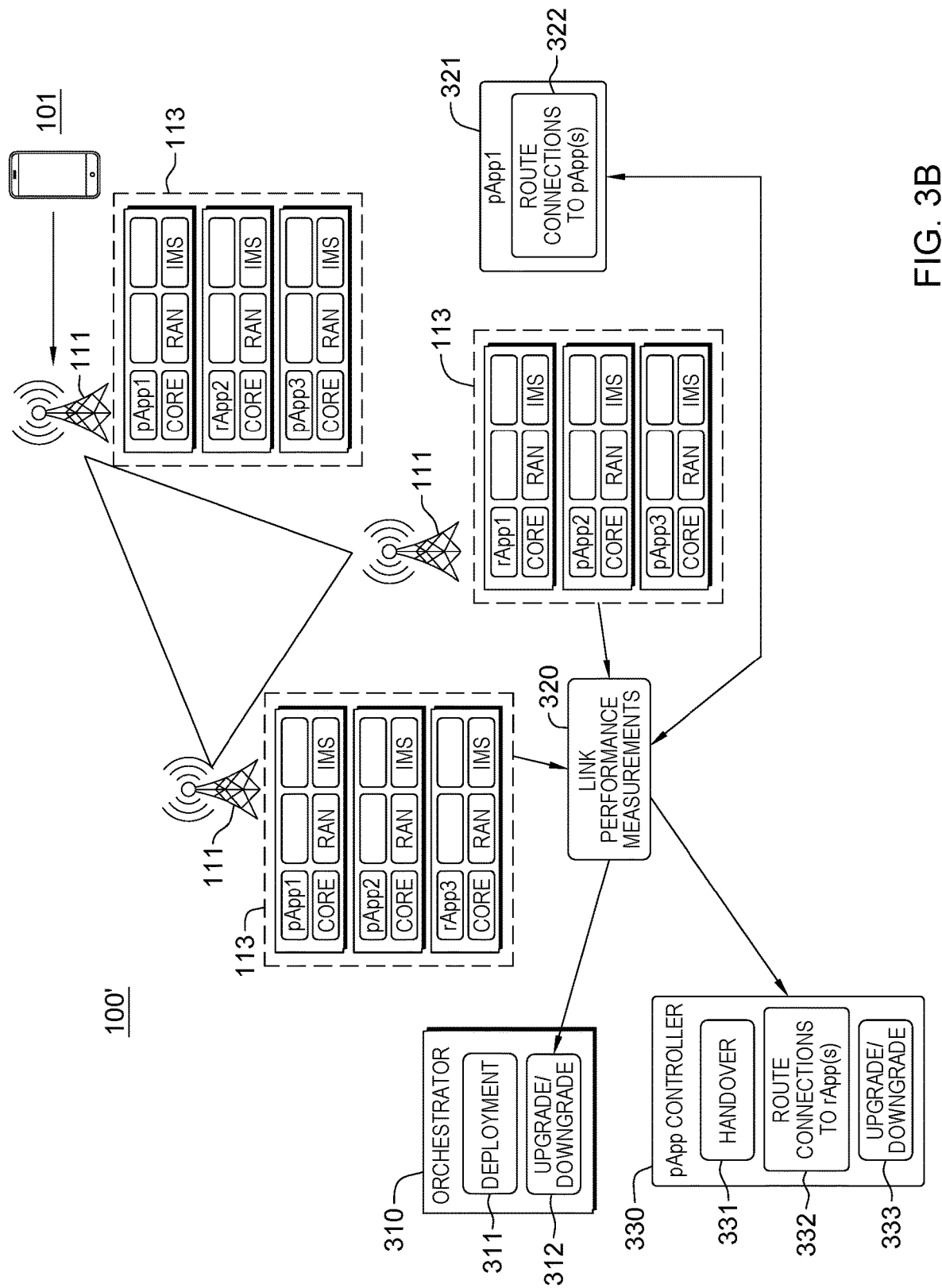
FIG. 3B depicts a further embodiment of a cellular network with edge application deployment and processing, in accordance with one or more aspects of the present invention.

FIG. 3B depicts a more detailed example of the network embodiment of FIGS. 2A-3A, where network 100' includes a plurality of edge sites with associated cell towers 111 and edge site computing infrastructures 113. In the embodiment illustrated, each edge site has either a pseudo application instance (pApp) or a real application instance (rApp) for each of three different edge applications (App1, App2, App3). By way of example only, in FIG. 3B, pseudo application instances (pApps) are deployed at edge sites without a corresponding real application instance (rApp). In one embodiment, each pseudo application instance (pApp) and real application instance (rApp) interfaces with appropriate core network components, the radio access network (RAN), and by way of example, a database, such as (IMS). As one example, a controller or orchestrator 310 at a higher level control plane oversees the deployment of the application via deployment program code 311 such that the edge sites have either a pseudo application instance (pApp) or a real application instance (rApp) of the edge application.

In one or more embodiments, link performance measurements 320 are obtained (e.g., retrieved, received, derived, etc.) and used by one or more aspects of workflows disclosed herein. The link performance measurements (or telecommunications network-derived measurements) can include or use detailed information already being collected by the network. For instance, in one or more embodiments, TRAN metrics from an SDN controller can be referenced, as can Quality of Service (QoS) management by, for instance, a 5G core network (UE→AN→UPF), as well as existing end-to-end protocols measuring QoS, such as, for instance, RTP (voice call), etc. From the network data, link QoS can be derived, such as, per-link bandwidth usage, latency, jitter, and other time-varying parameters.

As part of the deployment, a pseudo application instance (pApp) controller 330 is provided, for instance, within network 100' at one or more of the edge sites, or remote from the edge sties, such as at one or more cloud-based computing facilities. More particularly, in one or more embodiments, the pApp controller 330 can be an extension to Core and RAN components, such as the UPF. In one or more other embodiments, a single monolithic controller per monitoring area, etc., can be provided. In another embodiment, the pApp controller can be implemented as distributed microservices running on the edge clusters. In another embodiment, the controller can be an extension to Kubernetes, using, for instance, operator framework, service meshes and/or multi-cluster managers, or other tools that allow management of multiple Kubernetes clusters from a single plane of control.

In one embodiment, pApp controller 330 includes program code to facilitate handover of an interaction between pseudo application instances 331, routing of a connection of a pseudo application instance (pApp) to an appropriate real application instance (rApp) 332, as well as upgrading and/or downgrading of a pseudo application instance (pApp) and/or real application instance (rApp) 333. In the embodiment depicted, orchestrator 310 can also further include program code to assist with upgrading and/or downgrading 312 of a pseudo application instance (pApp) and/or real application instance (rApp), depending on the implementation desired. As explained herein, the pseudo application instances, such as pApp1 321, can include program code to facilitate route connection selection to an appropriate real application instance (rApp) 322 and/or retrieval of saved route connection information based, for instance, on prior determination of a route connection for that pseudo application instance.

Figure 4A:
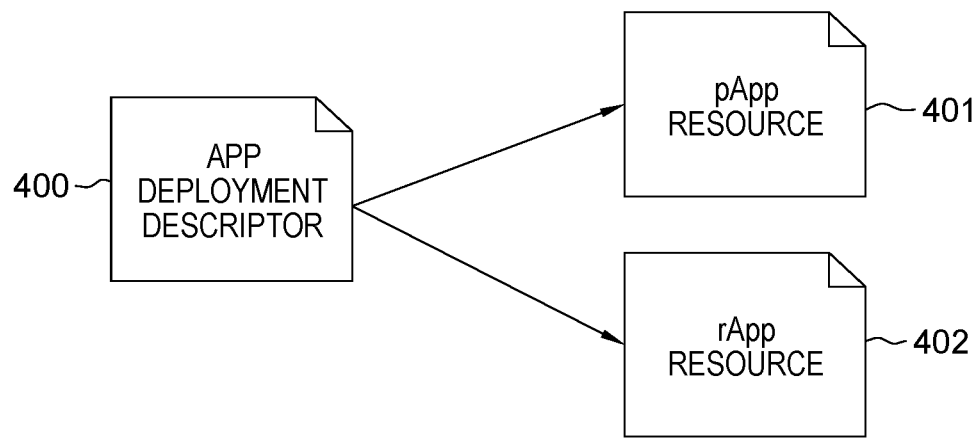
FIG. 4A illustrates one embodiment for deploying a collection of pseudo application instances (pApps) and one or more real application instances (rApps) of an application, in accordance with one or more aspects of the present invention.

FIG. 4A depicts one embodiment of program code deploying an edge application as a collection of pseudo application instances (pApps) and one or more real application instances (rApps). As illustrated, an application deployment descriptor 400 is obtained (e.g., received). In one embodiment, deployment descriptor 400 can include a development operator's input for the edge application being deployed. For instance, the obtained input can include basic application data/information, as well as desired Quality of Service (QoS) parameters, any application deployment constraints, and any pseudo application instance (pApp) thresholds. In one or more implementations, the provided information can impact, for instance, how many real application instances (rApps) are to run within the network, and/or when to transition between a pApp resource and an rApp resource, such as described herein. As illustrated in FIG. 4A, the application deployment descriptor is used (or referenced), in one embodiment, in generating a pseudo application instance, or pApp resource 401, and a real application instance, or rApp resource 402, for deployment within the network. In one embodiment, the pseudo application instance (pApp resource 401) is a lightweight application instance customized and configured for the particular application. Embodiments of the pseudo application instance (pApp) can be deployed using, for instance, container technology, Function as a Service (FaaS) computing services, etc., and the real application instance(s) (rApp) can be implemented using typical Kubernetes resources, such as services, deployments, pods, etc.

Figure 4B:
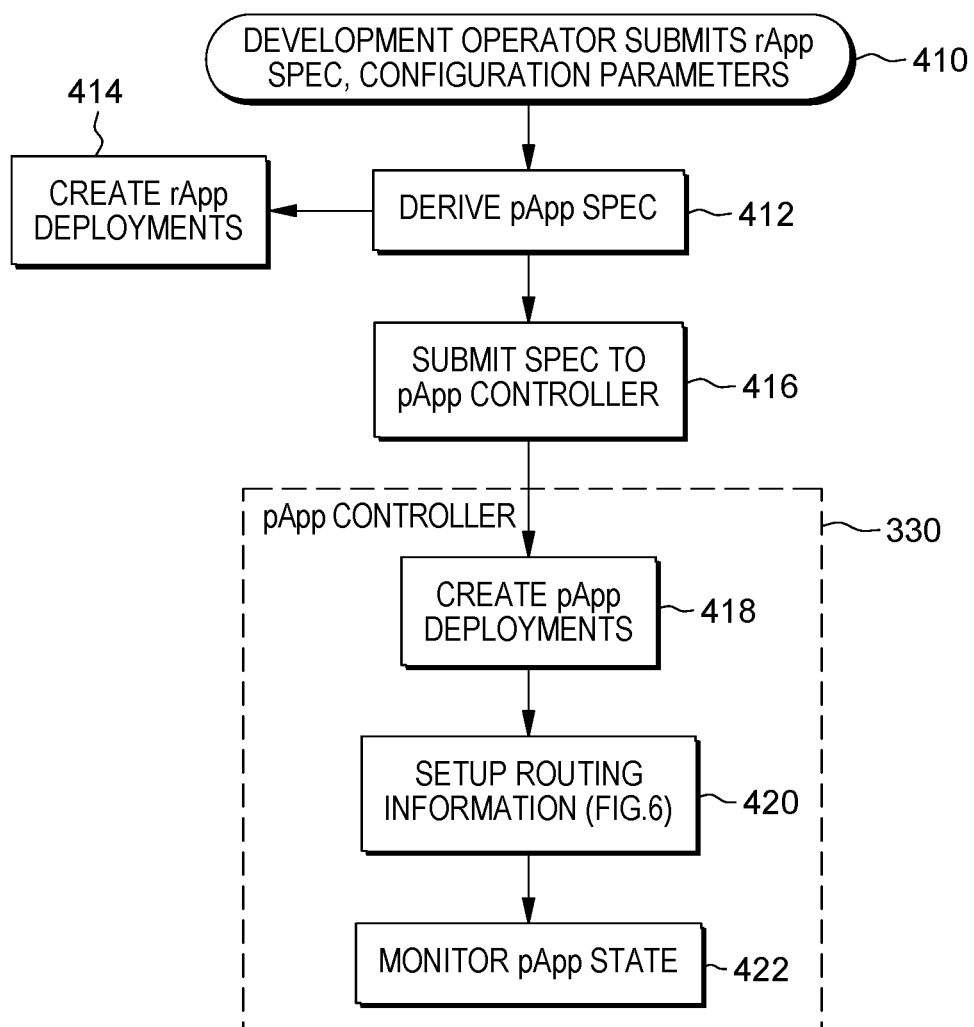
FIG. 4B depicts one embodiment of an edge application deployment workflow, in accordance with one or more aspects of the present invention.

FIG. 4B depicts further details of one embodiment of an edge application deployment workflow, in accordance with one or more aspects of the present invention. As illustrated, in one embodiment, a development operator submits, for instance, a real application instance (rApp) specification, and configuration parameters 410, such as those noted above in connection with FIG. 4A. Program code uses the received rApp specification and configuration parameters to derive a pseudo application instance (pApp) specification 412, as well as to create real application instance (rApp) deployments 414. In one or more embodiments, the derived pseudo application instance (pApp) specification is for a lightweight, application-specific instance of the rApp, with less application functionality than the rApp. The derived pseudo application instance (pApp) specification can be submitted 416 to pseudo application controller 330 (see FIG. 3B). In one or more implementations, pseudo application controller 330 includes program code to create and provide the pseudo application instance (pApp) deployments 418 to the desired edge sites for the particular application. As discussed, in one or more embodiments, the pseudo application instance (pApp) is deployed to more edge sites of the network than the real application instance (rApp). By way of example, applications with greater use can result in pApps being deployed, for instance, at every edge site of the network, while for applications with less use, fewer pseudo application instances (pApps) can be deployed across the network. Note that in one or more implementations, the pseudo application controller has access to data regarding the global state of the network including, for instance, the number and location of pseudo application instances (pApps), the number and location of real application instances (rApps), as well as the extent of communication between pseudo application instances (pApps) and real application instances (rApps), etc.

As illustrated in FIG. 4B, in one embodiment, pseudo application instance controller 330 further includes program code for setting up application routing information, for instance, to facilitate routing a user device interaction or session with the application from a pseudo application instance (pApp) to a designated or selected real application instance (rApp). In one implementation, the routing can be from a pseudo application instance (pApp) to a real application instance (rApp) at an edge site closest to the edge site containing the pseudo application instance (pApp). In the embodiment illustrated, the pseudo application controller 330 further includes program code for monitoring pApp state 422 during operation, that is, in end use. For instance, in one or more embodiments, the pseudo application controller can monitor a variety of types of pseudo application instance (pApp) information, such as number of connections, amount of data flowing through the pApps, etc. The monitored pseudo application state data can be used to facilitate, for instance, connection routing, handoff of an end-user interaction or session from one pseudo application instance (pApp) to another, and upgrading of a pseudo application instance (pApp) and/or downgrading of a real application instance (rApp), such as described herein.

As noted, monitoring of a pseudo application state can further be facilitated using various types of information already collected by networks, such as existing cellular networks. For instance, Quality of Service (QoS) data can be monitored via insights derived from network-collected data, such as bandwidth data, latency data, jitter data, and other time-varying parameters. Example embodiments can include TRAN metrics from an SDN controller, QoS Management by 5G Core, and other end-to-end protocols measuring QoS such as RTP (voice call), etc.

Figure 5A:
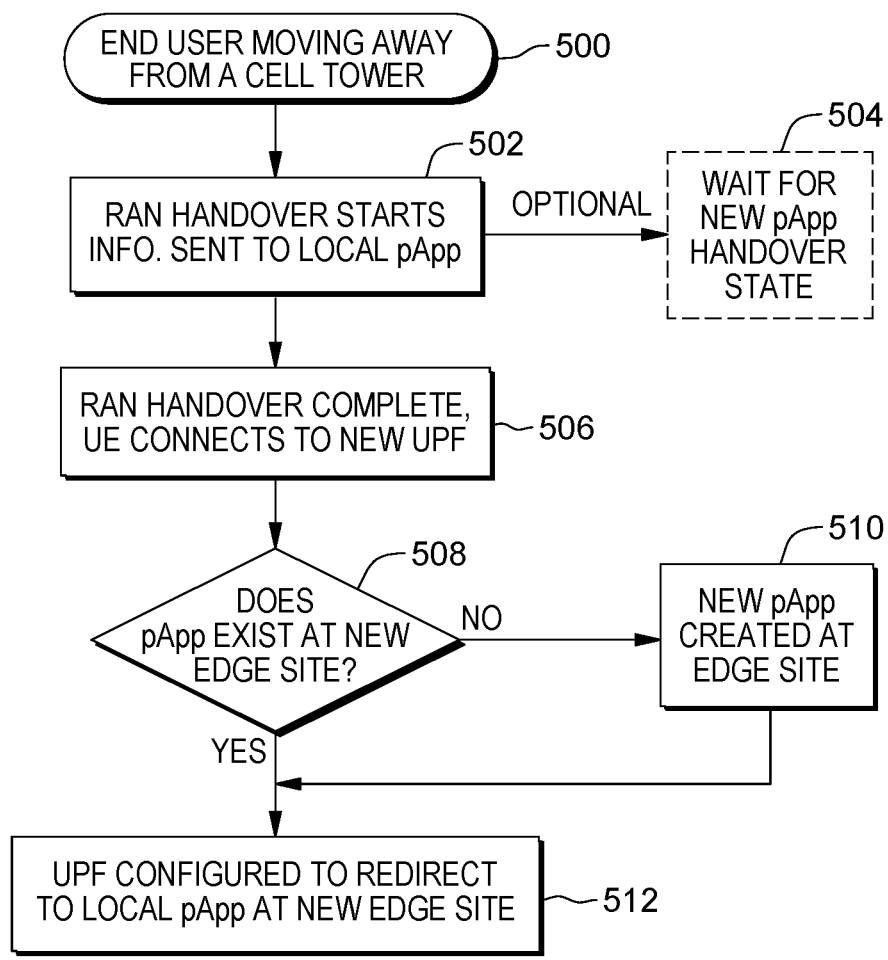
FIG. 5A illustrates one embodiment of an interaction handover workflow from one pseudo application instance (pApp) to another pseudo application instance (pApp) of an edge application deployed within a network, in accordance with one or more aspects of the present invention.

FIG. 5A illustrates one embodiment of an interaction handover workflow from one pseudo application instance (pApp) to another pseudo application instance (pApp) of a network, in accordance with one or more aspects of the present invention. In one embodiment, the network detects that an end-user is moving away from a cell tower of a current edge site to a cell tower at a new edge site 500. Based on detecting that the end-user, or more particularly, the end-user device having the user device interaction or session with the application, is moving away from the current cell tower, then in one embodiment, the radio access network(s) starts the handover of information sent to the current (or local) pseudo application instance (pApp) 502. For instance, information about the end user's exit from the current edge site can include wind-up of stateful connections, directions to ignore new incoming connections from that end user, an optional shutdown of the pseudo application instance (pApp) at the current location (e.g., based on predefined policies for the application), etc. Further, processing can optionally wait for the new pseudo application handover state 504 to occur. Once radio access network (RAN) handover is complete, the user equipment (or user device) connects to the user plane function (UPF) at the new edge site 506.

At the new edge site, program code determines whether a pseudo application instance (pApp) already exists at that site 508, and if not, a new pseudo application instance (pApp) is created or spawned for the edge site 510, if not already existing. Once the local pApp is identified, or created, for the new edge site, the user plane function (UPF) is configured to redirect the end user interaction with the application to the local pseudo application instance (pApp) at the new edge site 512. The UPF rules can be updated to route the user device interaction with the application successfully, and optionally, the pseudo application instance (pApp) can be reconfigured for extra load based on defined policies, and/or a real application instance (rApp) connected to the new pseudo application instance (pApp) can be updated.

Figure 5B:
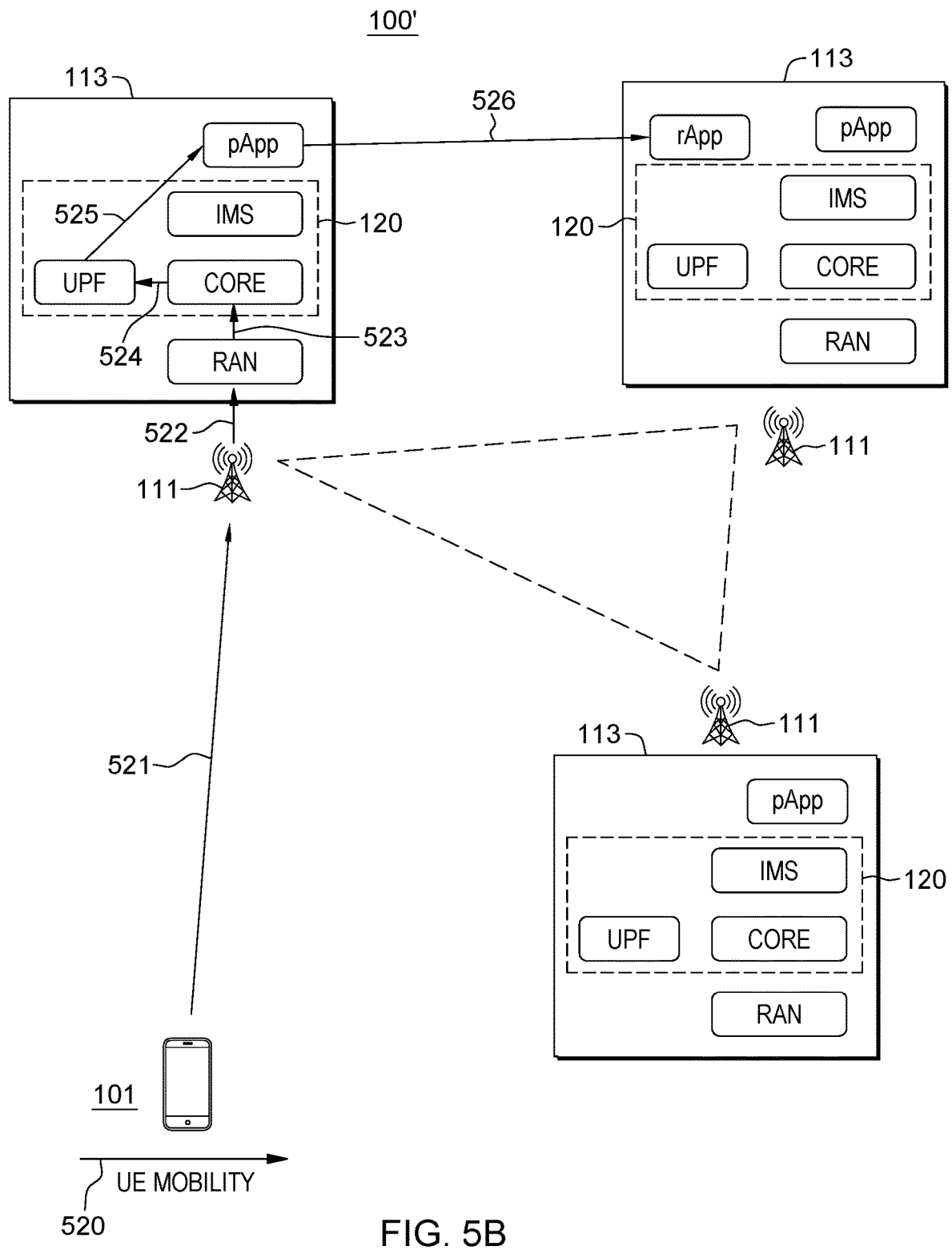
FIG. 5B depicts one embodiment of a user device interaction with an edge application deployed in layers including a pseudo application instance (pApp) at a plurality of edge sites of a network and a real application instance (rApp) at one or more edge sites of the network, in accordance with one or more aspects of the present invention.

FIG. 5B depicts one embodiment of a user device interaction with an edge application deployed at a plurality of edge sites of a network 100', such as described herein. In FIG. 5B, multiple edge sites are depicted by way of example, each with a respective cell tower 111 and edge site infrastructure 113, such as described herein. In the embodiment illustrated, edge site infrastructures 113 include or run a pseudo application instance (pApp) of the edge application, with one of the edge sites also including a real application instance (rApp) of the application, such as described herein. User equipment (UE) 101, such as a wireless user device, is mobile 520, with the user device being connected 521 to the network via the nearest cell tower 111. Cell tower 111 and radio access network (RAN) negotiate parameters of the connection 522. In one embodiment, users are connected to a gNb (Next Gen Node b) in a 5G cellular network. The RAN also has edge resources capable of hosting services (e.g., a Kubernetes cluster). A control unit of the RAN has information detailing connected user equipment (user mobile devices) and the applications being accessed. The control unit of the RAN passes this to the core network, where SMF maintains sessions, with the help of policies defined in PFC, and a control request is triggered to deploy pseudo application instance (pApp) to the edge site, if not already existing on-site. More particularly, in one embodiment, the core network, such as a 5G core network, sets up a session 523 for the user equipment (UE) based on the user parameters. Further a data path 524 is set up for the user equipment (UE) via a user plane function (UPF) instance, and the user equipment (UE) receives an IP address, in one embodiment. In one or more implementations, the UPF forwards 525 the connection for the desired edge application, for instance, App1, to the local pseudo application instance (pApp). As illustrated, the local pseudo application instance (pApp) then forwards 526 the user device interaction or session to the configured real application instance (rApp), which in the example of FIG. 5B, is running on another edge site infrastructure (by way of example). In one embodiment, pseudo application instance (pApp) and real application instance (rApp) discovery processing can be facilitated with the Core (UDR) maintaining a list of rApps and pApps at different gNbs and/or at a cloud-based computing location. This information can be passed to the gNb/RAN, and can be maintained by the control unit of the RAN. Either through RAN-to-RAN connections, or via the Core (UPF), the end user request can be routed (routing and forwarding) to the appropriate real application instance (rApp) that can serve the request.

Figure 5C:
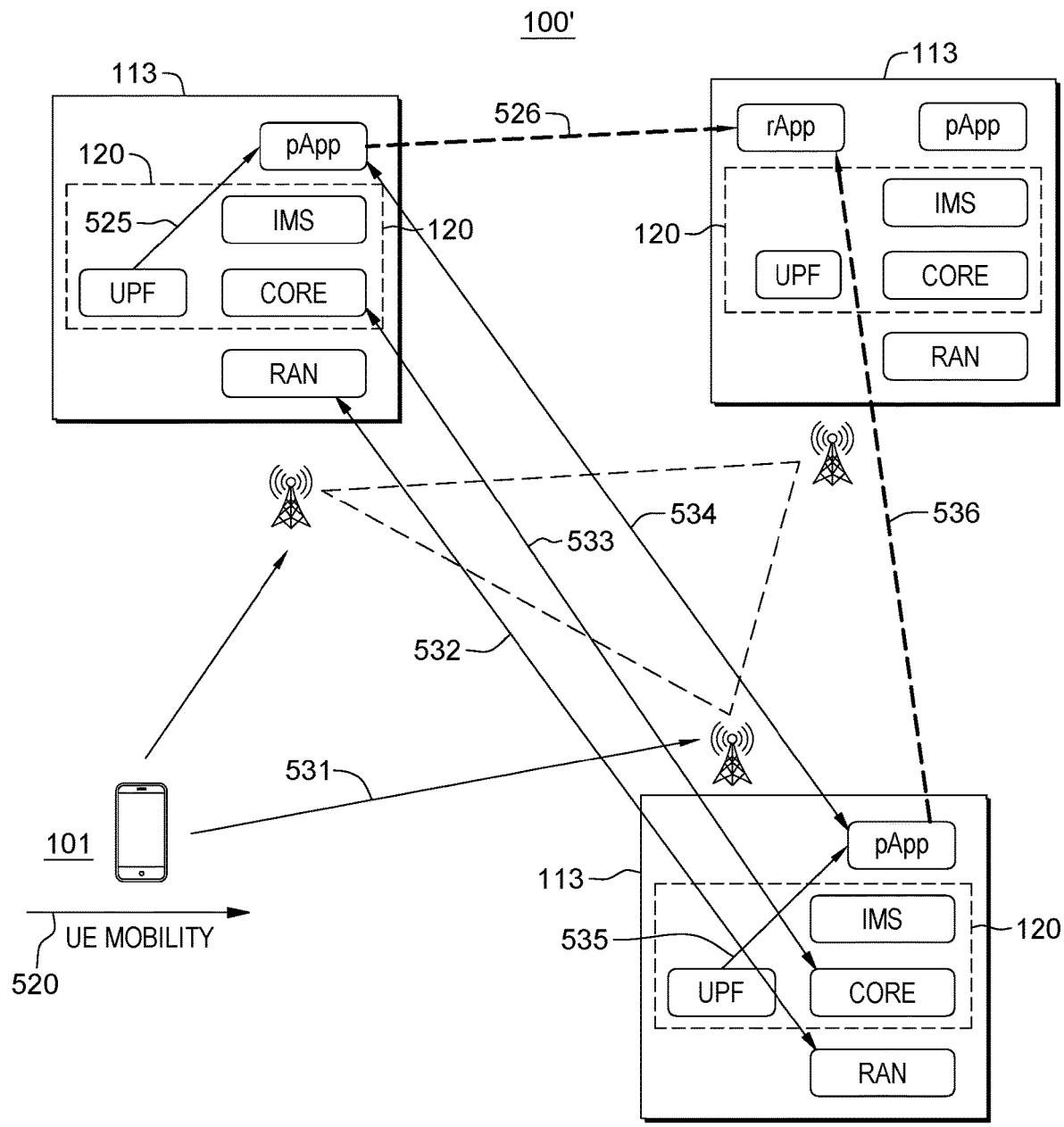
FIG. 5C depicts the embodiment of FIG. 5B, and illustrates handover of the user device interaction from one pseudo application instance (pApp) at one edge site to another pseudo application instance (pApp) at another edge site, in accordance with one or more aspects of the present invention.

FIG. 5C further depicts the network and edge application processing of FIG. 5B, and illustrates handover of the user device interaction from one pseudo application instance (pApp) at one edge site to another pseudo application instance (pApp) at another edge site, in accordance with one or more aspects of the present invention. As illustrated, user equipment (UE) 101, or the end user's device, moves 520 in accordance with the end user's mobility. As a result of the movement, the user equipment (UE) automatically reconnects 531 to the closest network cell tower with the strongest signal. The radio access network (RAN) negotiates 532 handover of the user-device connection between the two cell towers, and the network Core readjusts the user device session 533. For instance, a new user plane function (UPF) can be selected for routing connections. The pseudo application instance (pApp) to pseudo application instance (pApp) handoff 534 is triggered for any existing connections, transferring any state information needed for the end user's access to the edge application. As noted, a new pseudo application instance (pApp) may need to be created for the new edge site infrastructure to accommodate this transfer. New connections 535 from the end user then get routed from the local user plane function (UPF) to the local pseudo application instance (pApp), with the prior connections 525 also being shown from the earlier flow of FIG. 5B. The new pseudo application instance (pApp) at the current edge site infrastructure routes connections 536 to the real application instance (rApp), as before. Note that, in the example of FIG. 5C, the user device interaction is routed to the same real application instance (rApp) as in the earlier flow as one example only. It is not necessary that the pseudo application instance (pApp) on this new edge site infrastructure route to the same real application instance (rApp). The actual real application instance (rApp) routed to can depend on network conditions and state, distances involved, etc.

In one or more embodiments, the pseudo application instance (pApp) controller maintains a database with data tracking which edge sites, or edge site infrastructures, are currently running real application instances (rApps) and which are running pseudo application instances (pApps) for each application of one or more edge applications deployed in the network. Based on latency, performance and load, each pseudo application instance (pApp) can forward an end user request to one or more real application instances (rApps). Various routing strategies can be used. For instance, in one embodiment, each pseudo application instance (pApp) can be statically linked to one or more real application instances (rApps), where each request received by a pseudo application instance (pApp) is forwarded to one of the real application instances (rApp) in the link set. This can be used in scenarios where edge sites form islands, in which case it is better to connect or route end user requests to a nearby real application instance (rApp). In another embodiment, the system can be configured such that a pseudo application instance (pApp) determines the real application instance (rApp) to route user requests to at runtime using, for instance, load, performance and latency metrics available to the pseudo application instance (pApp) and/or pApp controller. The best real application instance (rApp) based on performance can be chosen for forwarding the end user request. This approach can be advantageous where there is a dense mesh formed by the edge sites, and current telemetry gives the best results with regard the overall request latency, performance, etc. Note that in the case of a 5G cellular network, routing of requests can be per-slice in the case of 5G slicing.

Figure 6:
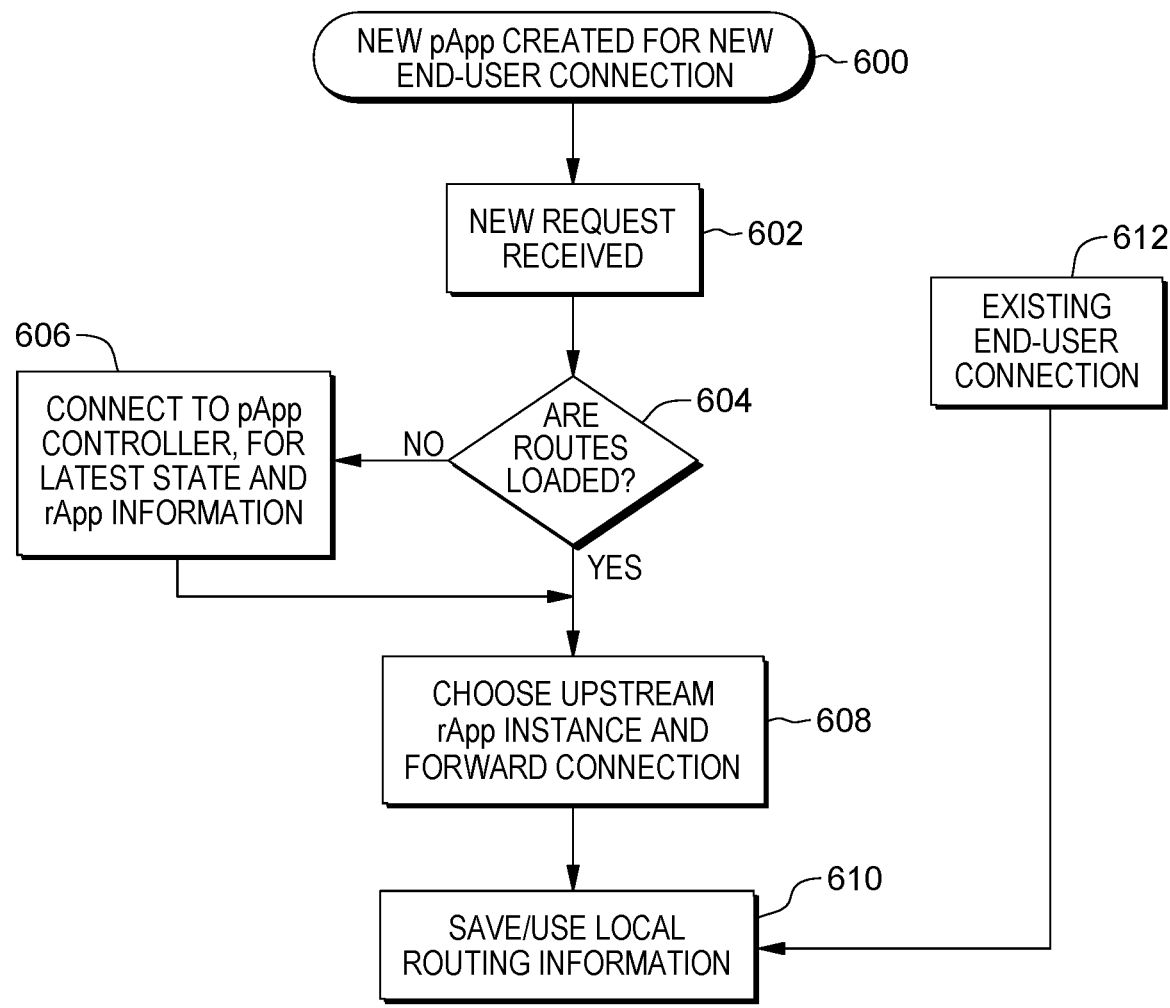
FIG. 6 depicts one embodiment of a route connection workflow from a pseudo application instance (pApp) of the edge application to a real application instance (rApp) of the edge application, in accordance with one or more aspects of the present invention.

FIG. 6 depicts one embodiment of routing application requests from a pseudo application instance (pApp) to real application instance (rApp), in accordance with one or more aspects of the present invention. The routing workflow depicted depends on whether the pseudo application instance (pApp) is a newly created pApp or a pApp with existing end user connections. Assuming that the pseudo application instance (pApp) is newly created for a new end user connection 600, then a new end user request for the application is received 602 and processing determines whether routes to one or more real application instances (rApps) have been loaded 604. If not, the pseudo application instance (pApp) connects to the pApp controller for latest state and real application instance (rApp) information 606, which allows the pseudo application instance (pApp) to choose an appropriate upstream real application instance (rApp) of the edge application, and to forward the end user connection to that rApp 608. The chosen rApp route connection is then saved as local routing information 610 for the pseudo application instance (pApp). Assuming that there is an existing end user connection 612, then the saved local routing information is accessed to allow the end user request for the edge application to be forwarded to the real application instance (rApp).

As noted, in a further aspect, edge application deployment and processing, in accordance with one or more aspects of the present invention, can include upgrading of a pseudo application instance (pApp) and/or downgrading of a real application instance (rApp). Deploying of a pseudo application instance (pApp) can be based on one or more policies. For instance, as a strategy, a first deployment of an edge application can always be a pseudo application instance (pApp). Further, whenever a potential usage of an application at an edge site is predicted, a pseudo application instance (pApp) can be spawned at that edge site infrastructure. In another policy, common or heavily used pseudo application instances (pApps) can be deployed initially, or preemptively, on all edge sites of the network, even before end user requests are received.

In one or more embodiments, policies can be defined to determine when to upgrade a pseudo application instance (pApp) to a real application instance (rApp) at one or more edge sites of a network. For instance, based on a number of end user requests, the user workload and/or resources available (based on a measurable policy base metric) at the edge site or nearby edge site, a pseudo application instance (pApp) can be upgraded to a real application instance (rApp). Once upgraded, the pseudo application instance (pApp) controller database can accordingly be updated for the availability of the new real application instance (rApp), so that this edge site can process end user requests to that edge site, as well as end user requests received from other edge sites, where needed. Another policy option is to specify a global view where, for instance, linear programming/constraint satisfaction/machine learning are used to maximize user Quality of Service (QoS) based on current traffic, while satisfying resource constraints on the cluster.

By way of further example, in one or more embodiments, a pseudo application instance (pApp) can be upgraded to a real application instance (rApp) via the control unit having a module implemented that accesses and categorizes the load of different types of services. Using a function $f$ (configured parameters+thresholds+resource availability) at the radio access network (RAN)/edge, a request can be generated for a pApp to rApp upgrade. In one implementation, the PFC determines based on implemented policies if the request can be serviced. If so, a signal is sent to the radio access network (RAN) control unit to orchestrate the rApp on the edge (RAN/edge has means to orchestrate a service, including the repository/image/data that would be required, or this can be passed by the Core to the RAN). Once the rApp is deployed, the pApp can be deactivated and other close-by gNbs and the Core can be notified about the new real application instance (rApp). The Core and other gNbs update their list along with connection information for any subsequent handover requests.

Similarly, downgrading of a real application instance (rApp) to a pseudo application instance (pApp) can be based on one or more specified policies. For instance, downgrading can be based on measured telemetry. For instance, if the number of requests received by the edge site drops below a certain threshold, then the real application instance (rApp) on the site can be downgraded to a pseudo application instance (pApp) in order to conserve resources. In another approach, a weighted combination of parameters can be used to determine a formula which controls when to downgrade a real application instance (rApp) to a pseudo application instance (pApp). As noted, downgrading a real application instance (rApp) to a pseudo application instance (pApp) advantageously conserves resources since the pApp is a lightweight, application-specific instance of the rApp, with less application functionality than the rApp, therefore requiring less resources to execute.

More particularly, in one or more implementations, a real application instance (rApp) can be downgraded to a pseudo application instance (pApp) via the control unit having a program code module that accesses and categorizes the load of different types of services being employed. Using the function $f$ (configured parameters+resource availability) at the radio access network (RAN)/edge, a request can be generated for the rApp to pApp downgrade. Based on generating the request, the PCF can determine based on implemented policies if the request can be serviced. If so, a signal is sent to the RAN control unit to remove the rApp on the edge site, and orchestrate the pApp instantiation. Once the pApp is running, other close-by gNbs and the Core can be notified about the new pApp deployment. The Core and other gNbs update their lists along with connection information for any subsequent handover requests.

Figure 7:
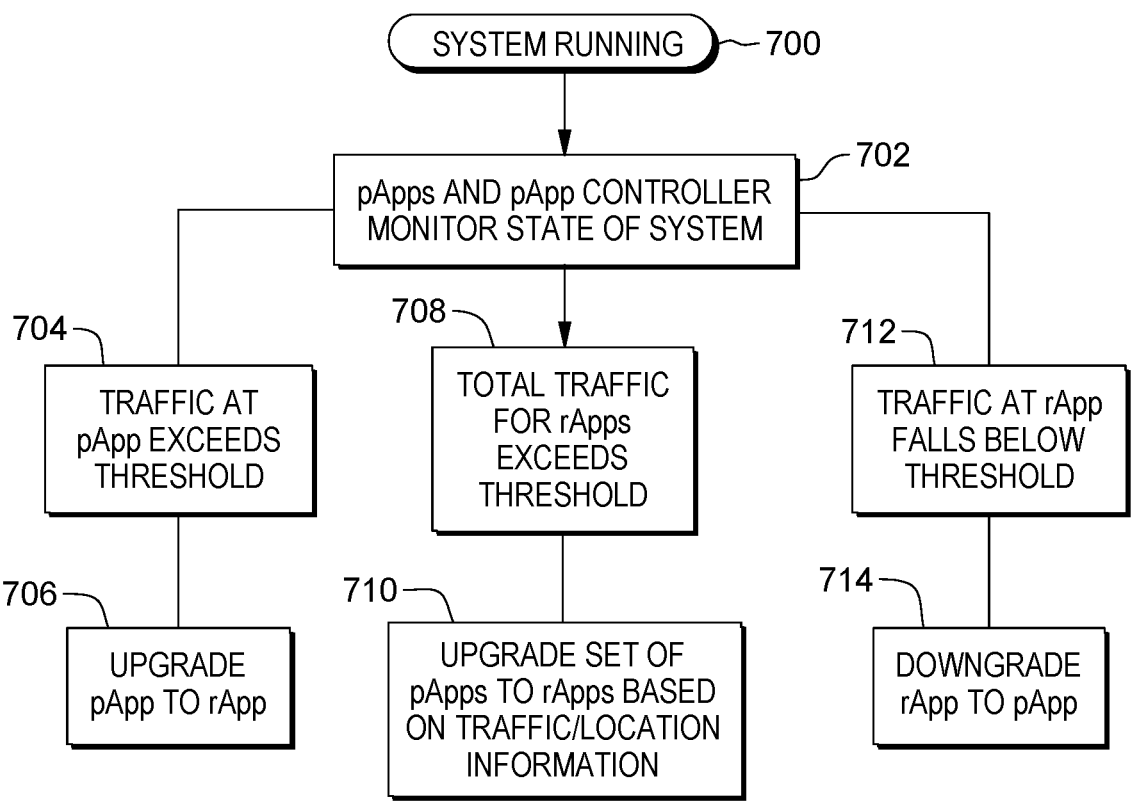
FIG. 7 depicts one embodiment of an application instance upgrade/downgrade workflow, illustrating certain aspects of one or more embodiments of the present invention.

FIG. 7 depicts one embodiment of an application instance upgrade/downgrade workflow, in accordance with one or more aspects of the present invention. With the system running 700, the pseudo application instances (pApps) deployed on the edge sites and the pApp controller monitor the state of the system 702 to control the upgrading or downgrading of application instances based on system performance. For instance, where monitored end user request traffic at a particular pseudo application instance (pApp) exceeds a specified threshold 704, the pseudo application instance (pApp) can be upgraded to a real application instance (rApp) 706. This can involve, in one embodiment, adding a new real application instance (rApp) at the edge site, leaving the pseudo application instance (pApp) in the workflow such that the edge site has both the pseudo application instance (pApp) and the real application instance (rApp) of the edge application.

Further, in one or more embodiments, total traffic for real application instances (rApps) can be monitored, and when it is determined that the traffic exceeds a specified threshold 708, a set of one or more pseudo application instances (pApps) can be upgraded to real application instances (rApps) based on the monitored traffic within the system and location of the selected pseudo application instances (pApps).

Further, in one or more embodiments, traffic at real application instances (rApps) can be monitored, and if traffic at a particular real application instance (rApp) falls below a specified threshold 712, that real application instance (rApp) can be downgraded to a pseudo application instance (pApp) of the edge application to run on the particular edge site.

Other variations and embodiments are possible.

Imputing counterfactual data (in association with machine learning model training) in accordance with one or more aspects of the present invention can be incorporated and used in many computing environments. One example computing environment is described with reference to FIG. 8. As an example, the computing environment is based on the z/Architecture® hardware architecture, offered by International Business Machines Corporation, Armonk, New York. The z/Architecture hardware architecture, however, is only one example architecture. The computing environment can also be based on other architectures, including, but not limited to, the Intel x86 architectures, other architectures of International Business Machines Corporation, and/or architectures of other companies.

As shown in FIG. 8, a computing environment 800 includes, for instance, a computer system 802 shown, e.g., in the form of a general-purpose computing device. Computer system 802 can include, but is not limited to, one or more processors or processing units 804 (e.g., central processing units (CPUs)), a memory 806 (a.k.a., system memory, main memory, main storage, central storage or storage, as examples), and one or more input/output (I/O) interfaces 808, coupled to one another via one or more buses and/or other connections. For instance, processors 804, and memory 806, are coupled to I/O interfaces 808 via one or more buses 810, and processors 804 are coupled to one another via one or more buses 811.

Bus 811 is, for instance, a memory or a cache coherence bus, and bus 810 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special purpose processors (e.g., adjunct processors) can be separate from but coupled to one or more general purpose processors and/or can be embedded within one or more general purpose processors. May variations are possible.

Memory 806 can include, for instance, a cache 812, such as a shared cache, which may be coupled to local caches 814 of processors 804 via, for instance, one or more buses 810. Further, memory 806 can include one or more programs or applications 816, at least one operating system 818, one or more computer readable program instructions 820 and one or more controller/orchestrator(s) 822 deploying one or more service(s) 821. Computer readable program instructions 820 and/or controller/orchestrator(s) 822 can be configured to carry out, or facilitate, functions of embodiments of aspects of the invention.

Computer system 802 can communicate via, e.g., I/O interfaces 808 with one or more external devices 830, such as a user terminal, a tape drive, a pointing device, a display, and one or more data storage devices 834, etc. A data storage device 834 can store one or more programs 836, one or more computer readable program instructions 838, and/or data, etc. The computer readable program instructions can be configured to carry out functions of embodiments of aspects of the invention.

Computer system 802 can also communicate via, e.g., I/O interfaces 808 with a network interface 832, which enables computer system 802 to communicate with one or more networks, such as a local area network (LAN), a general wide area network (WAN), and/or a public network (e.g., the Internet), providing communication with other computing devices or systems.

Computer system 802 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 802. Examples, include, but are not limited to: microcode, device drivers, redundant processing units, external disk drive arrays, RAID systems, tape drives, and data archival storage systems, etc.

Computer system 802 can be operational with numerous other general-purpose or special purpose computing system environments or configurations. Examples of well-known computing systems, environments, and/or configurations that may be suitable for use with computer system 802 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 9A:
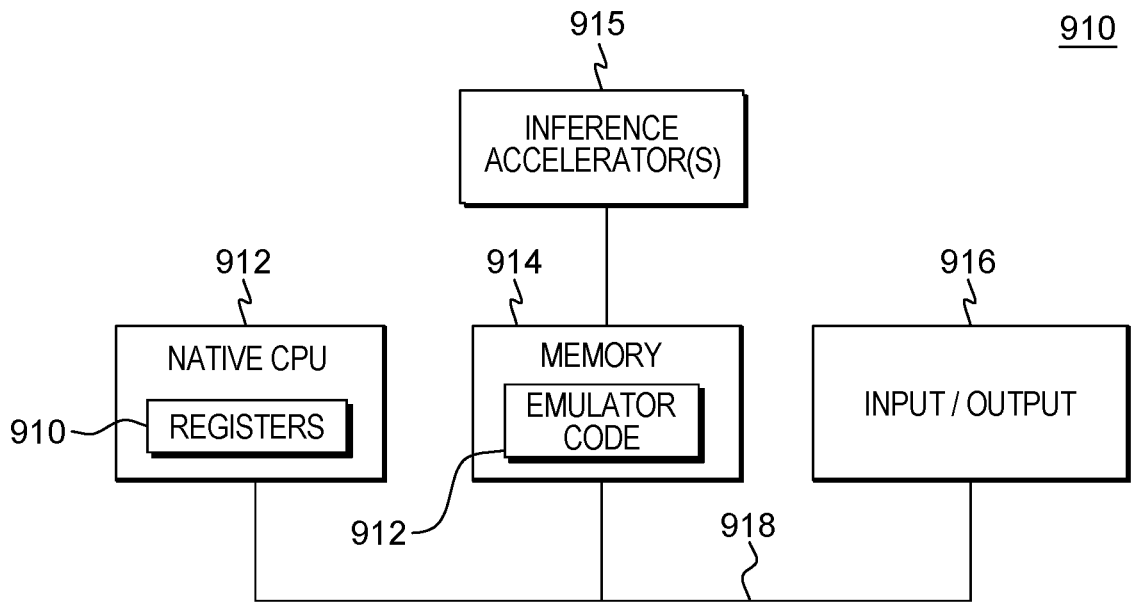
FIG. 9A depicts another example of a computing environment to incorporate and/or use one or more aspects of the present invention.

Another embodiment of a computing environment which can incorporate and use one or more aspects of the present invention is described with reference to FIG. 9A. In this example, a computing environment 900 includes, for instance, a native central processing unit (CPU) 912, a memory 914, and one or more input/output devices and/or interfaces 916 coupled to one another via, for example, one or more buses 918 and/or other connections. As examples, computing environment 910 may include a PowerPC® processor offered by International Business Machines Corporation, Armonk, New York; an HP Superdome with Intel Itanium II processors offered by Hewlett Packard Co., Palo Alto, California; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 912 includes one or more native registers 920, such as one or more general purpose registers and/or one or more special purpose registers used during processing within the environment. These registers include information that represents the state of the environment at any particular point in time.

Moreover, native central processing unit 912 executes instructions and code that are stored in memory 914. In one particular example, the central processing unit executes emulator code 922 stored in memory 914. This code enables the computing environment configured in one architecture to emulate another architecture. For instance, emulator code 922 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 9B:
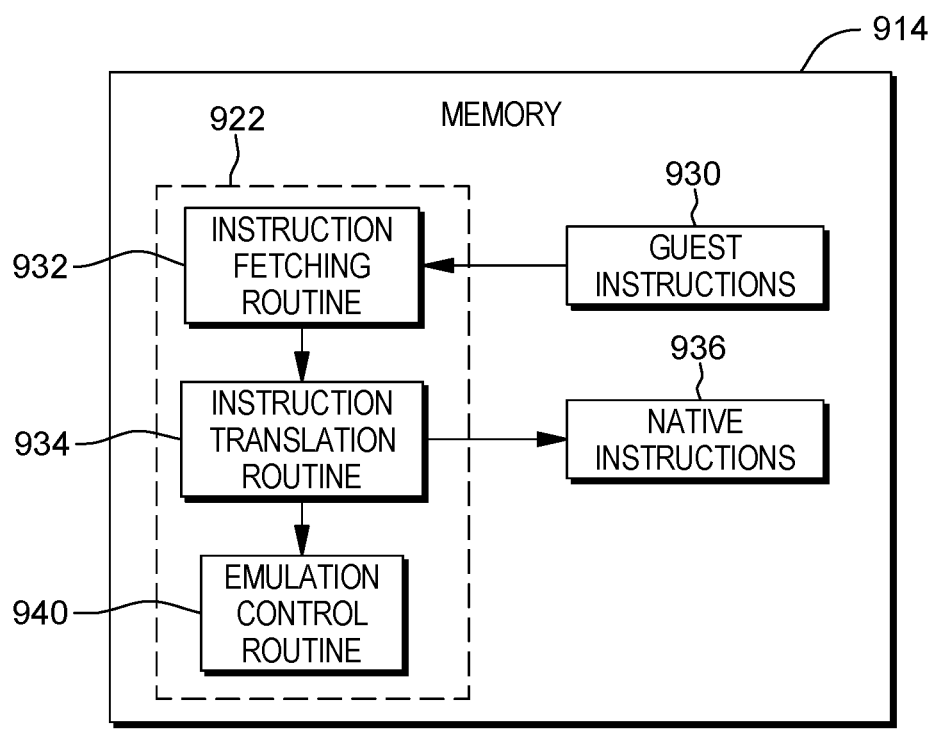
FIG. 9B depicts further details of the memory of FIG. 9A, in accordance with one or more aspects of the present invention.

Further details relating to emulator code 922 are described with reference to FIG. 9B. Guest instructions 930 stored in memory 914 comprise software instructions (e.g., correlating to machine instructions) that were developed to be executed in an architecture other than that of native CPU 912. For example, guest instructions 930 may have been designed to execute on a processor based on the z/Architecture hardware architecture, but instead, are being emulated on native CPU 912, which may be, for example, an Intel Itanium II processor. In one example, emulator code 922 includes an instruction fetching routine 932 to obtain one or more guest instructions 930 from memory 914, and to optionally provide local buffering for the instructions obtained. It also includes an instruction translation routine 934 to determine the type of guest instruction that has been obtained and to translate the guest instruction into one or more corresponding native instructions 936. This translation includes, for instance, identifying the function to be performed by the guest instruction and choosing the native instruction(s) to perform that function.

Further, emulator code 922 includes an emulation control routine 940 to cause the native instructions to be executed. Emulation control routine 940 may cause native CPU 912 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 936 may include loading data into a register from memory 914; storing data back to memory from a register; or performing some type of arithmetic or logic operation, as determined by the translation routine.

Each routine is, for instance, implemented in software, which is stored in memory and executed by native central processing unit 912. In other examples, one or more of the routines or operations are implemented in firmware, hardware, software or some combination thereof. The registers of the emulated processor may be emulated using registers 920 of the native CPU or by using locations in memory 914. In embodiments, guest instructions 930, native instructions 936 and emulator code 922 may reside in the same memory or may be disbursed among different memory devices.

Further, in one embodiment, computing environment 910 includes one or more inference accelerators 915 coupled to memory 914. The one or more accelerators are defined in one architecture and are configured to emulate another architecture. For example, an accelerator obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, virtual environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to optimize container deployment for a given deployment environment and/or to perform to one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
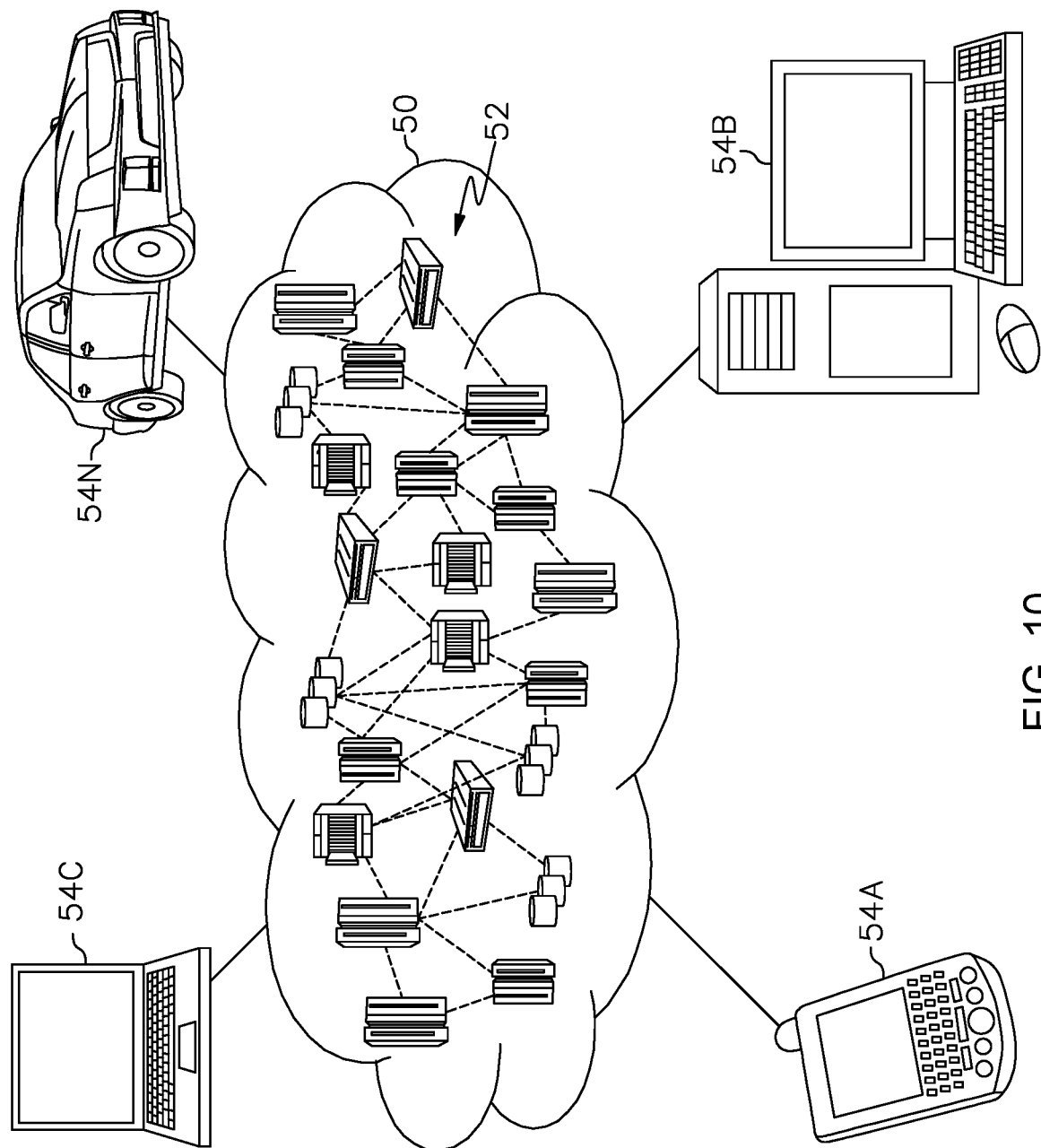
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
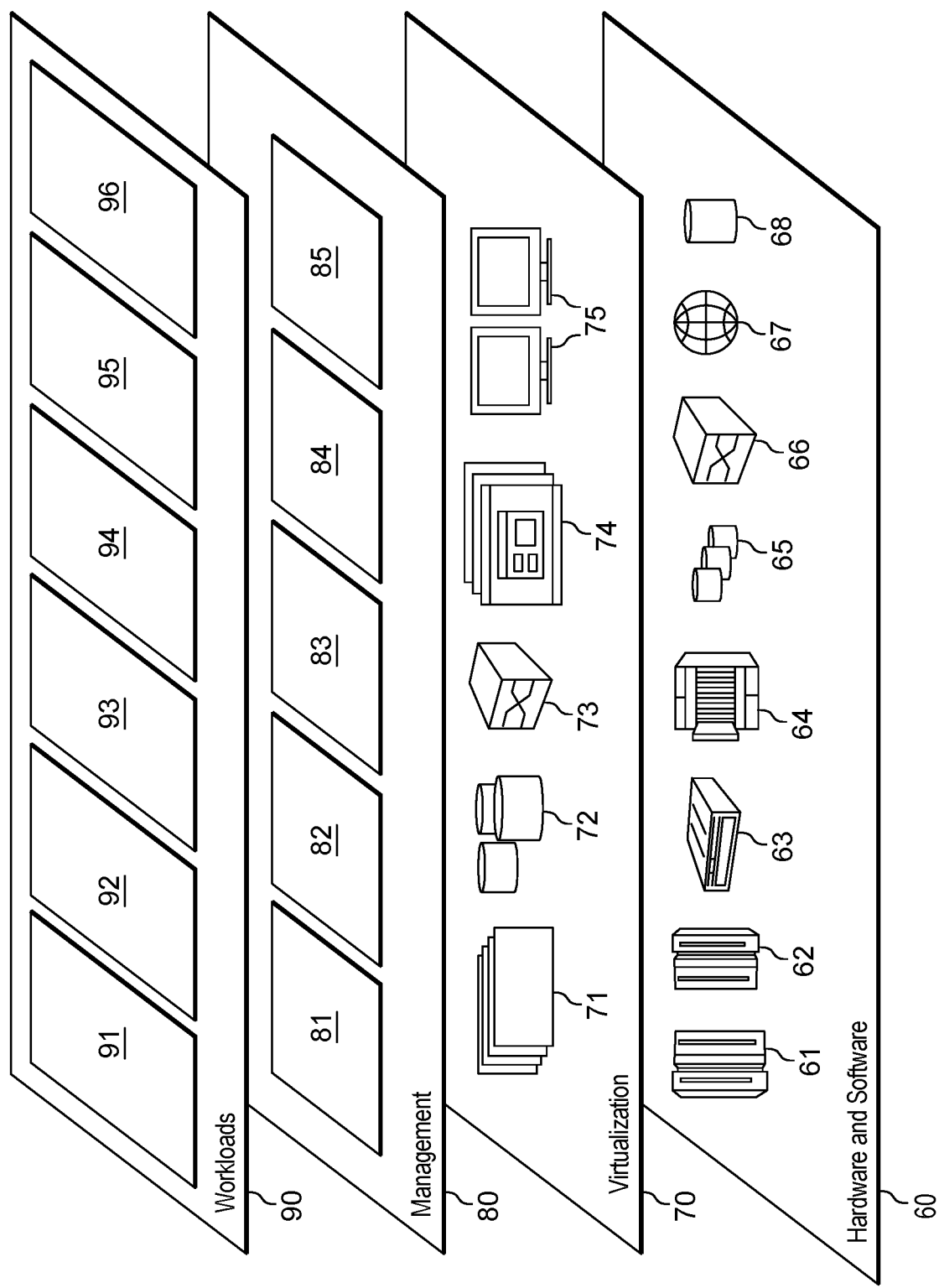
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge application deployment processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other deployment characteristics may be considered, as well as various variations to the processing logic. Many variations are possible.

Various aspects are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer readable storage media and program instruction s embodied therewith, the program instructions being readable by a processing circuit to cause the processing circuit to perform a method comprising:
        performing an edge application deployment in a network, wherein the network includes a plurality of edge sites with edge computing infrastructure, and wherein the performing comprises:
            deploying a pseudo application instance (pApp) of the edge application at each edge site of a first group of one or more edge sites of the plurality of edge sites; and
            deploying a real application instance (rApp) of the edge application at each edge site of a second group of one or more edge sites of the plurality of edge sites, wherein the pApp is a lightweight, application-specific instance of the rApp with less application functionality than the rApp, wherein the first group of one or more edge sites of the plurality of edge sites is larger than the second group of one or more edge sites of the plurality of edge sites, and wherein a user device interaction with the edge application is through a selected pApp of the first group of one or more edge sites of the plurality of edge sites to an rApp of the second group of one or more edge sites of the plurality of edge sites.

2. The computer program product of claim 1, wherein the first group of one or more edge sites of the plurality of edge sites comprises the plurality of edge sites.

3. The computer program product of claim 1, wherein the network is a cellular network, and the method further comprises, based on user device movement, handing-off the user device interaction with the edge application from the selected pApp of the first group of one or more edge sites of the plurality of edge sites to another pApp of the first group of one or more edge sites of the plurality of edge sites.

4. The computer program product of claim 1, further comprising selecting, by the selected pApp of the first group of one or more edge sites of the plurality of edge sites, the rApp of the second group of one or more edge sites of the plurality of edge sites for servicing the user device interaction at runtime using one or more determined performance metrics.

5. The computer program product of claim 1, further comprising upgrading at runtime a pApp of an edge site of the first group of one or more edge sites of the plurality of edge sites to an rApp based on one or more monitored, policy-based metrics.

6. The computer program product of claim 1, further comprising downgrading at runtime an rApp of an edge site of the second group of one or more edge sites of the plurality of edge sites to a pApp based on one or more monitored, policy-based metrics.

7. The computer program product of claim 1, wherein performing the edge application deployment in the network is via one or more container orchestrators.

8. A computer-implemented method comprising:
performing an edge application deployment in a network, wherein the network includes a plurality of edge sites with edge computing infrastructure, and wherein the performing comprises:
deploying a pseudo application instance (pApp) of the edge application at each edge site of a first group of one or more edge sites of the plurality of edge sites; and
deploying a real application instance (rApp) of the edge application at each edge site of a second group of one or more edge sites of the plurality of edge sites, wherein the pApp is a lightweight, application-specific instance of the rApp with less application functionality than the rApp, wherein the first group of one or more edge sites of the plurality of edge sites is larger than the second group of one or more edge sites of the plurality of edge sites, and wherein a user device interaction with the edge application is through a selected pApp of the first group of one or more edge sites of the plurality of edge sites to an rApp of the second group of one or more edge sites of the plurality of edge sites.

9. The computer-implemented method of claim 8, wherein the first group of one or more edge sites of the plurality of edge sites comprises the plurality of edge sites.

10. The computer-implemented method of claim 8, wherein the network is a cellular network, and the method further comprises, based on user device movement, handing-off the user device interaction with the edge application from the selected pApp of the first group of one or more edge sites of the plurality of edge sites to another pApp of the first group of one or more edge sites of the plurality of edge sites.

11. The computer-implemented method of claim 8, further comprising selecting, by the selected pApp of the first group of one or more edge sites of the plurality of edge sites, the rApp of the second group of one or more edge sites of the plurality of edge sites for servicing the user device interaction at runtime using one or more determined performance metrics.

12. The computer-implemented method of claim 8, further comprising upgrading at runtime a pApp of an edge site of the first group of one or more edge sites of the plurality of edge sites to an rApp based on one or more monitored, policy-based metrics.

13. The computer-implemented method of claim 8, further comprising downgrading at runtime an rApp of an edge site of the second group of one or more edge sites of the plurality of edge sites to a pApp based on one or more monitored, policy-based metrics.

14. The computer-implemented method of claim 8, wherein performing the edge application deployment in the network is via one or more container orchestrators.

15. A computer system for facilitating processing within a computing environment, the computer system comprising:
a memory; and
at least one processor in communication with the memory, wherein the computer system is configured to perform a method, said method comprising:
performing an edge application deployment in a network, wherein the network includes a plurality of edge sites with edge computing infrastructure, and wherein the performing comprises:
deploying a pseudo application instance (pApp) of the edge application at each edge site of a first group of one or more edge sites of the plurality of edge sites; and
deploying a real application instance (rApp) of the edge application at each edge site of a second group of one or more edge sites of the plurality of edge sites, wherein the pApp is a lightweight, application-specific instance of the rApp with less application functionality than the rApp, wherein the first group of one or more edge sites of the plurality of edge sites is larger than the second group of one or more edge sites of the plurality of edge sites, and wherein a user device interaction with the edge application is through a selected pApp of the first group of one or more edge sites of the plurality of edge sites to an rApp of the second group of one or more edge sites of the plurality of edge sites.

16. The computer system of claim 15, wherein the first group of one or more edge sites of the plurality of edge sites comprises the plurality of edge sites.

17. The computer system of claim 15, wherein the network is a cellular network, and the method further comprises, based on user device movement, handing-off the user device interaction with the edge application from the selected pApp of the first group of one or more edge sites of the plurality of edge sites to another pApp of the first group of one or more edge sites of the plurality of edge sites.

18. The computer system of claim 15, further comprising selecting, by the selected pApp of the first group of one or more edge sites of the plurality of edge sites, the rApp of the second group of one or more edge sites of the plurality of edge sites for servicing the user device interaction at runtime using one or more determined performance metrics.

19. The computer system of claim 15, further comprising upgrading at runtime a pApp of an edge site of the first group of one or more edge sites of the plurality of edge sites to an rApp based on one or more monitored, policy-based metrics.

20. The computer system of claim 15, further comprising downgrading at runtime an rApp of an edge site of the second group of one or more edge sites of the plurality of edge sites to a pApp based on one or more monitored, policy-based metrics.

\* \* \* \* \*